US006986491B2

(12) United States Patent  (10) Patent No.: US 6,986,491 B2
Anderson  (45) Date of Patent: Jan. 17, 2006

(54) CPU HOLDER

(75) Inventor: Robert Paul Anderson, Comstock Park, MI (US)

(73) Assignee: Knape & Vogt Manufacturing Co., Grand Rapids, MI (US)

( * ) Notice: Subject to any disclaimer, the term of this patent is extended or adjusted under 35 U.S.C. 154(b) by 15 days.

(21) Appl. No.: 10/291,949

(22) Filed: Nov. 12, 2002

(65) Prior Publication Data

US 2004/0089781 A1 May 13, 2004

(51) Int. Cl.
A47H 1/10 (2006.01)

(52) U.S. Cl. .................................... 248/317; 248/674
(58) Field of Classification Search .............. 70/18, 70/58, 30, 49; 248/674, 225.11, 285.1, 332, 248/317, 316.1, 323, 328, 329, 785.1, 918, 248/447.2, 316.8, 637, 917; 254/294, 310, 254/376, 342, 213, 225
See application file for complete search history.

(56) References Cited

U.S. PATENT DOCUMENTS

| | | | | |
|---|---|---|---|---|
| 2,793,904 | A | * | 5/1957 | Gale ........................... 294/74 |
| 4,101,109 | A | | 7/1978 | Edwards |
| 4,520,979 | A | | 6/1985 | McInnis |
| 4,619,429 | A | * | 10/1986 | Mazza ..................... 248/447.2 |
| 5,131,620 | A | | 7/1992 | Boundy |
| 5,139,223 | A | | 8/1992 | Sedighzadeh |
| 5,310,152 | A | | 5/1994 | O'Neill |
| 5,393,025 | A | | 2/1995 | Franklin |
| 5,490,655 | A | | 2/1996 | Bates |
| 5,551,658 | A | | 9/1996 | Dittmer |
| 5,610,798 | A | | 3/1997 | Lochridge |
| 5,927,668 | A | | 7/1999 | Cyrell |
| D423,910 | S | | 5/2000 | Cyrell |
| 6,073,892 | A | | 6/2000 | Dittmer |
| 6,098,944 | A | | 8/2000 | Pangborn et al. |
| 6,102,350 | A | | 8/2000 | Cyrell |
| 6,123,309 | A | | 9/2000 | Sage |
| 6,147,873 | A | | 11/2000 | Huang |
| 6,216,927 | B1 | | 4/2001 | Meritt |
| 6,402,111 | B1 | | 6/2002 | Stewart et al. |
| 6,409,127 | B1 | | 6/2002 | Vander Heide et al. |
| 6,454,234 | B1 | | 9/2002 | Westbrook |

* cited by examiner

Primary Examiner—Gwendolyn Baxter
(74) Attorney, Agent, or Firm—Mayer, Brown, Rowe & Maw LLP

(57) ABSTRACT

A computer unit holder for supporting a computer unit under a desk or other work surface is disclosed. The computer unit holder includes a cable that extends downwardly and underneath the computer unit to support it. The cable may be supported by two side panels, one of which includes an adjustment mechanism for changing the length of the exposed cable. One of the side panels may be adjustable toward and away from the other side panel. A movable mount may also be included so that the load of the computer unit will always be centered under the mount.

12 Claims, 22 Drawing Sheets

CPU HOLDER

BACKGROUND OF THE INVENTION

The present invention relates generally to electronic unit holding devices, and more particularly to a computer holding unit that is positioned underneath a surface, such as a work surface.

The use of computers at home and in the office has grown tremendously in the last decade. Currently, computers are often sold with a number of physically separate parts. These typically include a monitor, a keyboard, and a main computer unit. The monitor or display is typically placed on top of a work surface, while the keyboard is either also placed on a work surface or on an adjustable keyboard holder that may be adjustably mounted to the underside of a work surface. The main computer unit is typically a rectangular unit that rests on the floor in a location somewhat removed from the computer monitor. Cables run between the computer monitor, the keyboard, and the main computer unit. The main computer unit typically houses the computer motherboards and daughter boards, memory, and CD ROM and disc drives.

Oftentimes the placement of the main computer unit on the floor is undesirable. Positioning the computer unit on the floor may subject it to being kicked by the user's legs, may require the user to uncomfortably bend over to access the computer unit, and/or it may make it very difficult to connect and disconnect the cabling to the computer unit. In order to avoid these and other problems, computer unit holders have been developed in the past. One such prior art computer unit holder is disclosed in U.S. Pat. No. 6,402,111 issued to Stewart et al. Prior art computer unit holders such as this one, however, have suffered from various disadvantages. For example, the computer unit holder disclosed in the Stewart patent is essentially made up of a rectangular, rigid body. Such a holding unit often does not perform satisfactorily for computer units that may not be completely rectangularly shaped. In other words, computer units that don't match the rigid shape of the holding unit disclosed in this patent cannot be held as well by this computer unit holder.

Prior art computer unit holders have also had other disadvantages. In some cases, the computer unit holder has limited adjustability. The computer unit therefore cannot be easily manipulated while held by the computer holder. This may make the connection or disconnection of cables and cords unduly difficult. Also, this may make other tasks difficult where access to the computer unit is necessary.

Another difficulty with prior art computer unit holders is the manner in which they support the computer unit. If the computer unit is not centered underneath the mounting portion of the holder, this can create uneven loads on the mounting portion of the holder. This can cause excessive stress either on the mounting portion itself, or the work surface to which the computer unit holder is attached. This can also require the use of higher strength materials and more complex designs for the computer unit holder, which all may tend to increase the overall cost of the computer unit holder.

Another disadvantage of the prior art computer unit holders is the fact that these holders only function to support the computer unit. Computers are generally expensive pieces of electronic equipment. As such, they can be the targets of theft. Prior art computer unit holders often provide little deterrence against such theft, as they can be easily manipulated so as to release the computer unit mounted therein. The desire can therefore be seen for a computer unit holder that overcomes these and other disadvantages.

SUMMARY OF THE INVENTION

Accordingly, the present invention provides an improved computer unit holder that alleviates many, if not all, of the above-mentioned difficulties. The computer unit holder of the present invention provides theft deterrence, easy adjustability, and centered load support. The computer unit of the present invention also accommodates computer units whose shape is not rectangular.

According to one aspect of the present invention, a computer unit holder is provided that includes a base, a first side panel, a second side panel, and an elongated flexible member. The first side panel is mounted to the base and oriented generally perpendicularly with respect to the base. The second side panel is adjustably mounted to the base and is also oriented generally perpendicular to the base. The first and second side panels are oriented generally parallel to each other. The second side panel is adapted to be moved toward and away from the first panel along the base. The elongated flexible member is mounted to one or both of the first and second side panels and extends away from the first and second side panels in a direction opposite the base. The elongated flexible member has a length sufficient to extend underneath a computer unit positioned underneath the base and between the first and second side panels.

A computer unit holder according to another aspect of the present invention comprises a base, an elongated flexible member, an adjustment mechanism, and a keyway. The elongated flexible member is supported by the base and is of a length sufficient to extend underneath a computer unit positioned underneath the base. The adjustment mechanism adjusts the distance which the elongated flexible member extends downwardly from the base. The adjustment mechanism includes a lock that is adapted to allow the distance of the elongated flexible member to be decreased, but not increased. The keyway is defined such that it is in communication with the lock. The keyway is adapted to allow a key to be inserted therein and to unlock the lock so that the distance that the elongated flexible member extends downwardly from the base can be increased when a key is inserted in the keyway.

A computer unit holder according to yet another aspect of the present invention includes an elongated base, an elongated flexible member, and a mount. The elongated base has a top, a bottom, and first and second ends. The elongated flexible member is supported by the base and extends downwardly from the bottom of the base. The elongated flexible member is sufficiently long to extend underneath a computer unit positioned underneath the base. The mount is adjustably attached to the base and positioned on the top side of the base. The mount is adapted to be able to rotate about the base around a substantially vertical axis when the mount is attached to a stationary supporting structure positioned above the base. The mount is further adapted to be adjustably moved along the base toward and away from the first and second ends of the base.

According to other aspects of the present invention, the elongated flexible member may be a cable. The portion of the cable underneath the first and second side panels, or the base, may be free from any contact with any rigid structures, other than a supported computer unit, so that the cable is free to flex to the shape of the computer unit. The adjustment mechanism may include a circular member attached to a ratchet wheel which is operably connected to a pawl. The mount may be adapted to be supported by an elongated tray that is attached to a support structure wherein the mount can slide back and forth along the length of the tray. The cable or elongated flexible member may include one or more cable guides that contact a portion of the supported computer unit. The base may be constructed of extruded aluminum and the side panels may be constructed of molded plastic.

DETAILED DESCRIPTION OF THE INVENTION

Figure 1:
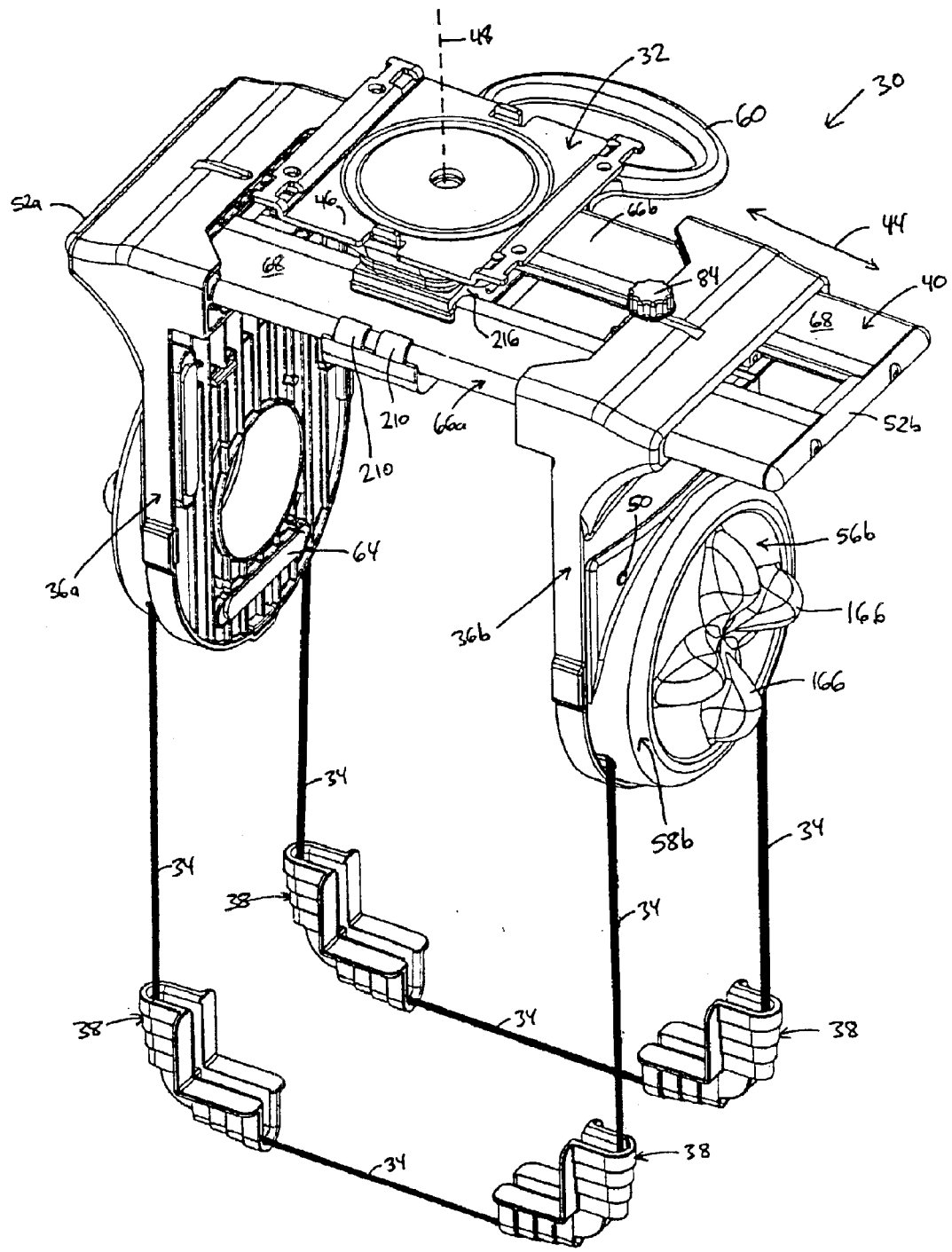
FIG. 1 is a perspective view of a computer unit holder according to a first embodiment of the present invention.
Figure 2:
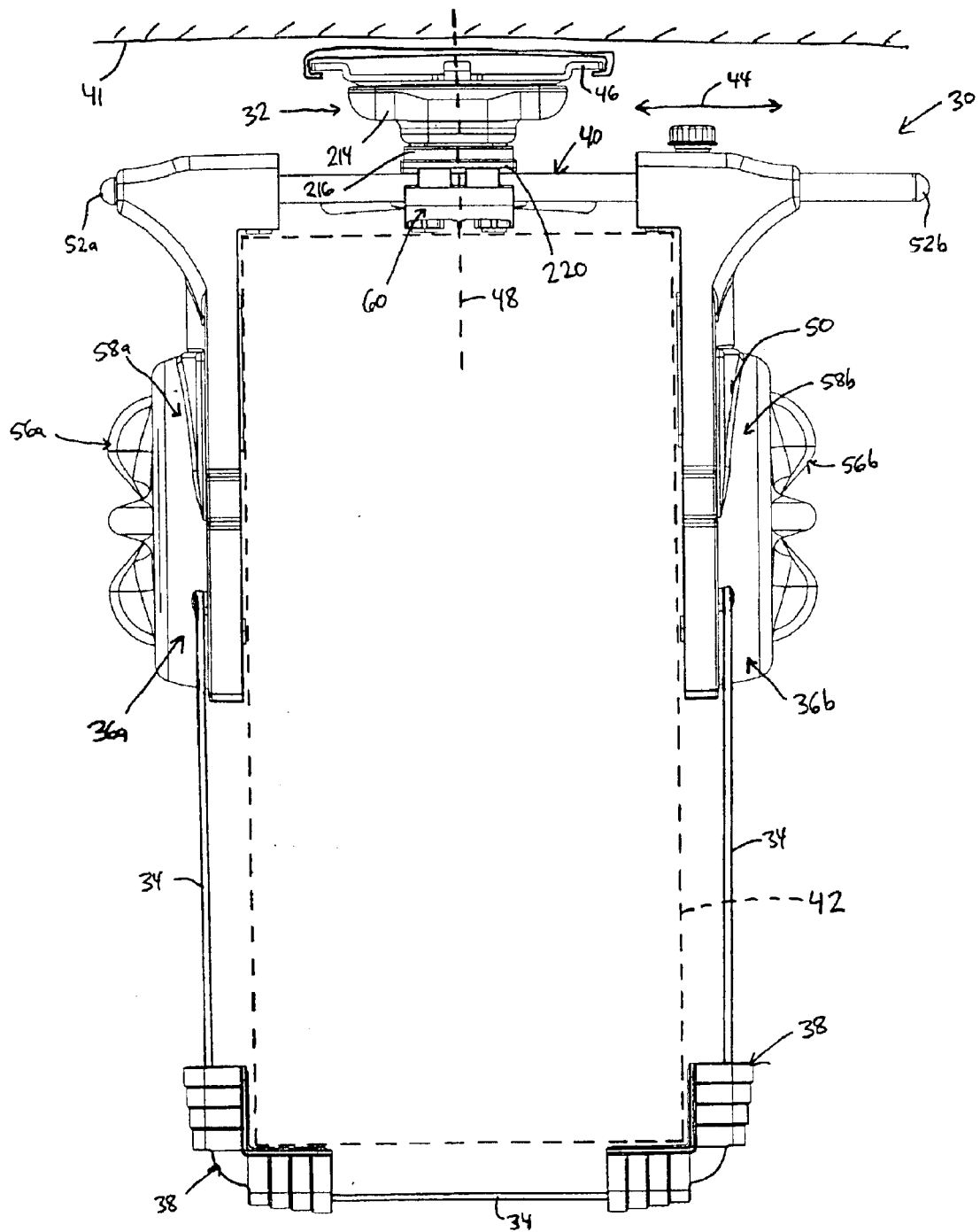
FIG. 2 is a front, elevational view of the computer unit holder of FIG. 1.

The present invention will now be described wherein the reference numerals appearing in the following written description correspond to like-numbered elements in the several drawings. A computer unit holder 30 according to one embodiment of the present invention is depicted in FIG. 1. Computer unit holder 30 is adapted for mounting to a stationary structure 41, such as the underside of a desk work surface, or other type of work surface (FIG. 2). Computer unit holder 30 includes a mount 32 which may be directly mounted by fasteners, or otherwise, to the underside of a work surface. Alternatively, mount 32 may be mounted to a tray that is attached to the underside of a work surface as will be described more herein. Computer unit holder 30 includes a cable 34 that extends downwardly from a first and second side panel 36a and b. First and second side panels 36 are mounted on a base 40. Cable 34 is threaded through four cable guides 38. Cable 34, first and second side panels 36, and base 40 define a boundary around an area in which a computer unit 42 (FIG. 2) may be held. In the example of FIG. 2, computer unit 42 is illustrated as having a rectangular shape. It will be understood by those skilled in the art that computer unit holder 30 can be used with computer units 42 having shapes other than rectangular. By way of a non-exhaustive list of examples, computer unit 42 may be square, have rounded sides, or be completely circular. Additionally, computer unit 42 may be used to house other components besides computer units.

Computer unit holder 30 can be easily adjusted to accommodate different size computer units. Second side panel 36b can be slid along the base 40 in the direction identified by arrow 44 (FIGS. 1 and 2). This sliding movement allows the space between first and second side panels 36a and b to be altered. Different widths of computer units 42 can thereby be accommodated by computer unit holder 30. As will be described in more detail below, the length of cable 34 can be adjusted so that the overall size of the computer unit 42 can be varied. Other than a mounting plate 46, the entire computer unit holder 30 is also pivotable about a vertical axis 48 (FIGS. 1 and 2). This pivoting is facilitated by a handle 60 and allows the computer unit 42 to be rotated to an orientation that is more accessible by the user. This also allows the cable connections that may need to be made to the computer unit, which are usually made on the back of the unit, to be easily made.

After a computer unit 42 is placed on top of cable guides 38, the length of cable 34 is shortened until the computer unit is snugly held in place. Second side panel 36b is also moved until its inner surface is in contact with the computer unit 42. In this configuration, computer unit 42 is snugly held in place by computer unit holder 30. By increasing the tightness of cable 34, computer unit 42 can be held securely so that it cannot be removed from computer unit holder 30. In order to remove the computer unit 42, a key must be inserted into a keyway 50 and manipulated therein so that the length of cable 34 can be increased. Computer unit holder 30 therefore provides a deterrent against theft of computer unit 42.

Mount 32 of computer unit holder 30 is also slidable along base 40 in the direction of arrow 44. Regardless of the width of computer unit 42, mount 32 can therefore be positioned directly above the center of computer unit 42. In this manner, the weight of computer unit 42 is directly centered under mount 32. This decreases the stresses applied to mount 32, and the stationary structure to which it may be attached. This also simplifies the design and construction of computer unit holder 30.

Figure 3:
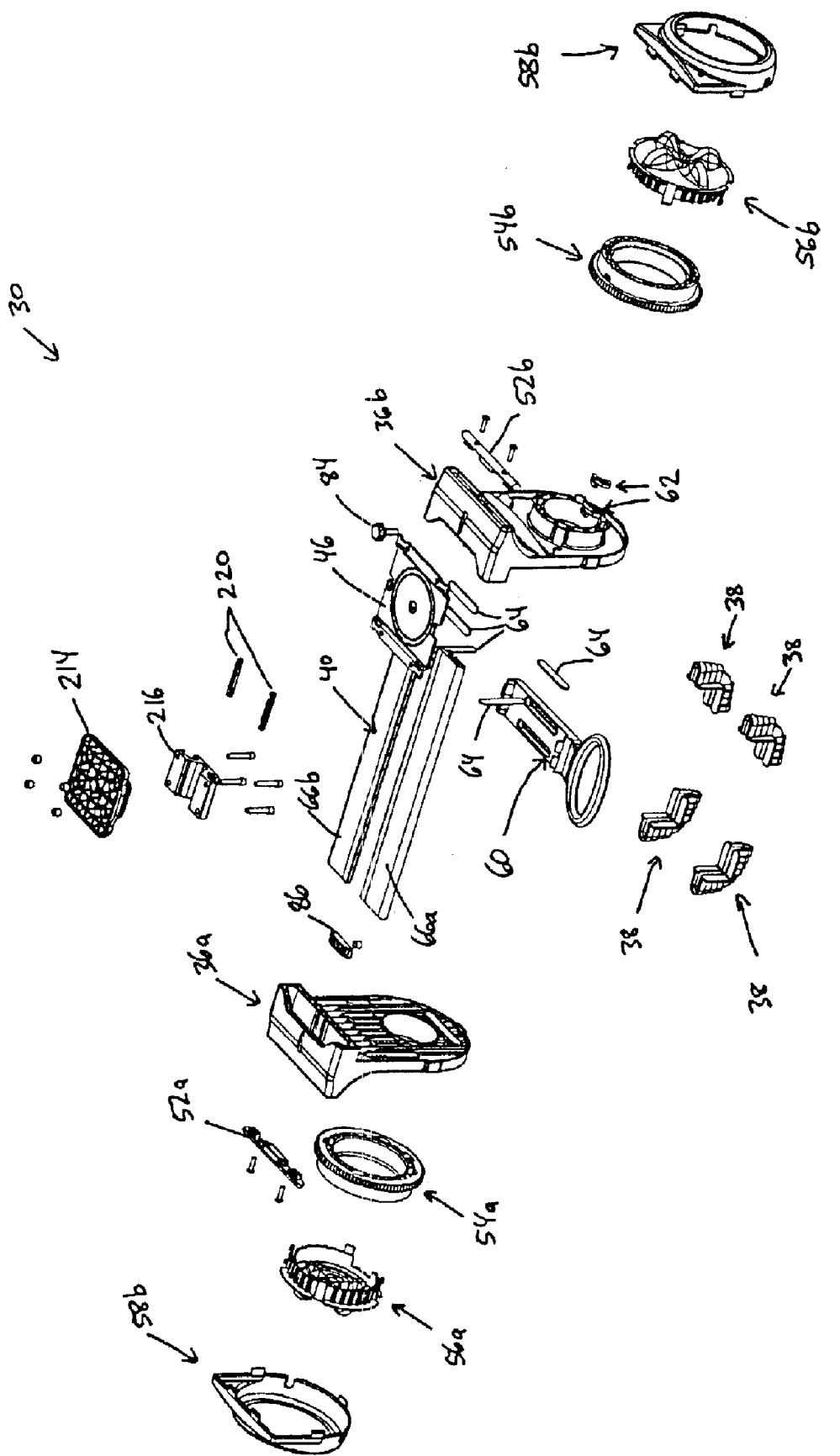
FIG. 3 is an exploded perspective view of the computer unit holder of FIG. 1.

FIG. 3 depicts an exploded view of computer unit holder 30. In addition to those components described above, computer unit holder 30 further includes two end caps 52a and b, two ratchet wheels 54a and b, two ratchet handles 56a and b, and two ratchet covers 58a and b. FIG. 3 also illustrates handle 60, a pawl 62, the various components of mount 32, and a plurality of compressible pads 64.

Figure 4:
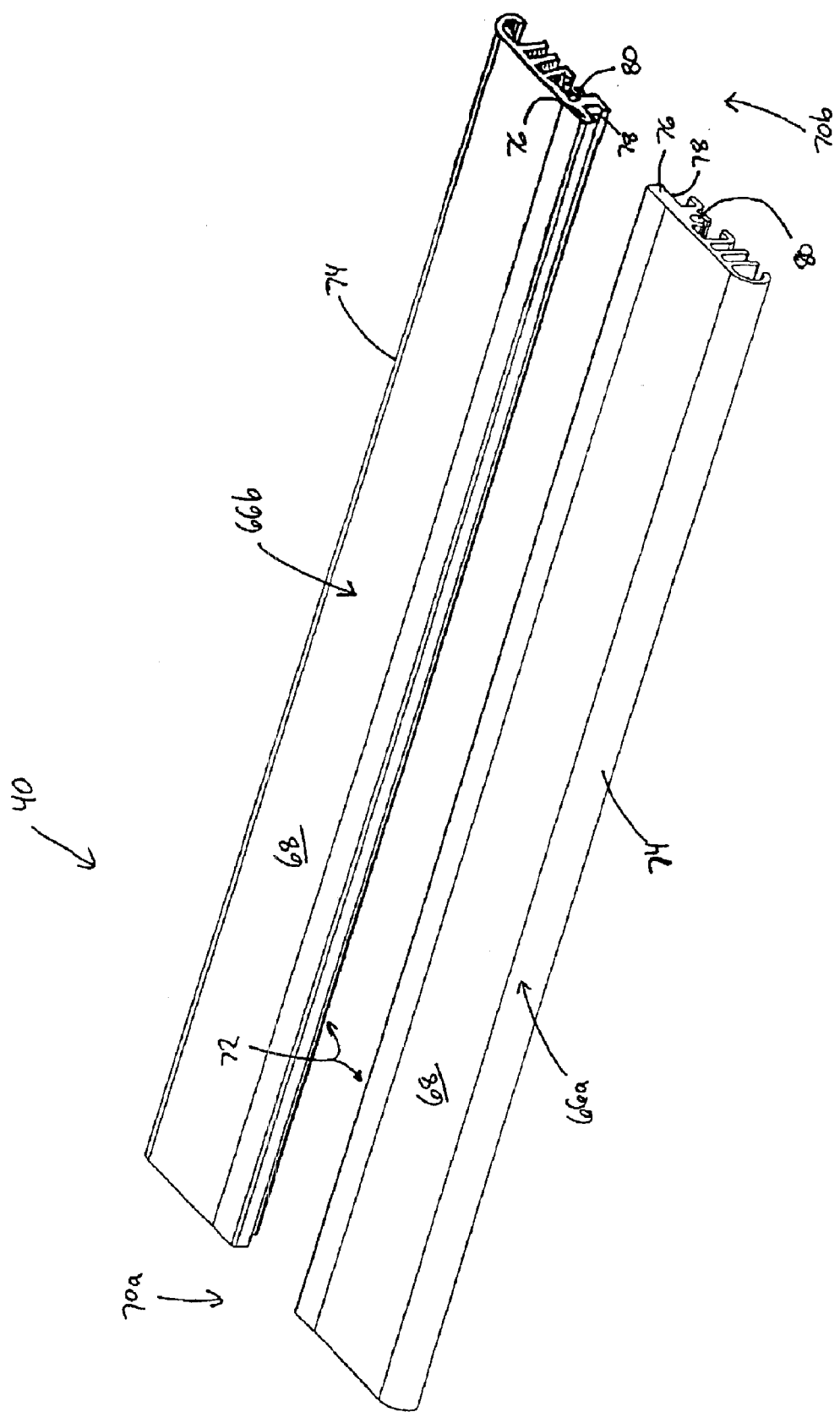
FIG. 4 is a perspective view of a base of the computer unit holder of FIG. 1.

As shown in FIG. 4, base 40 is made up of two base bars 66a and b. Base bars 66a and b may be made from metal, such as aluminum or other parts. Preferably base bars 66a and b are extruded, although other manufacturing techniques can be used. Base bars 66a and b each include a top surface 68, first and second ends 70a and b, an interior side 72, and an exterior side 74. Base bars 66a and b are arranged so that interior sides 72 face toward each other. Top surface 68 of base bars 66 extends toward interior side 72 a greater distance than the bottom surface of base bars 66. This creates a flange 76 that extends outwardly from interior side 72. Flange 76 includes an underside 78, which is used to secure mount 32 to base 40 as will be described in more detail herein. First and second ends 70a and b of base bars 66a and b each include a pair of screw holes 80. Screw holes 80 receive screws that are used to secure end caps 52a and b to each end of base bars 66.

Figure 5:
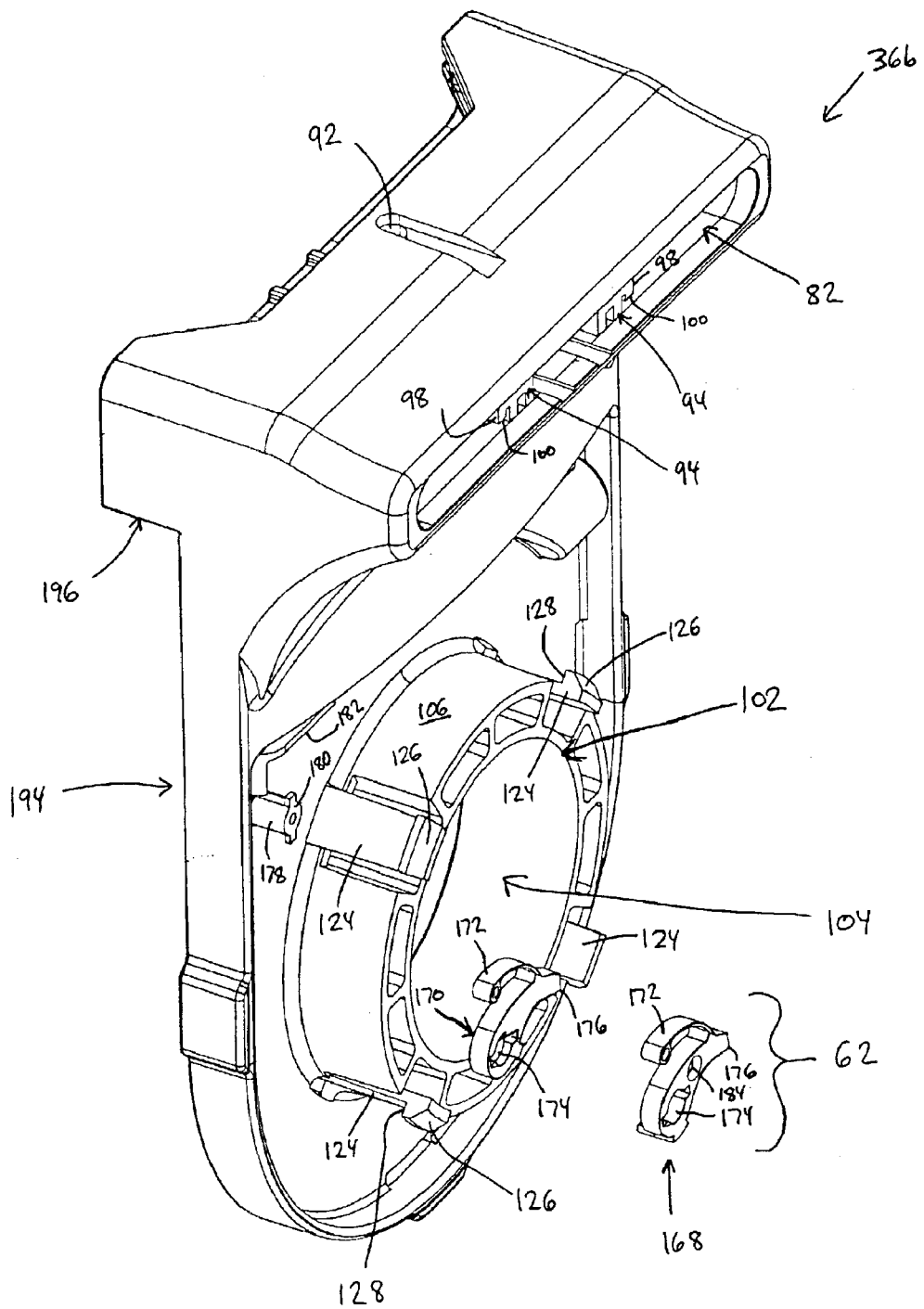
FIG. 5 is a perspective view of a first side panel taken from a first direction.
Figure 6:
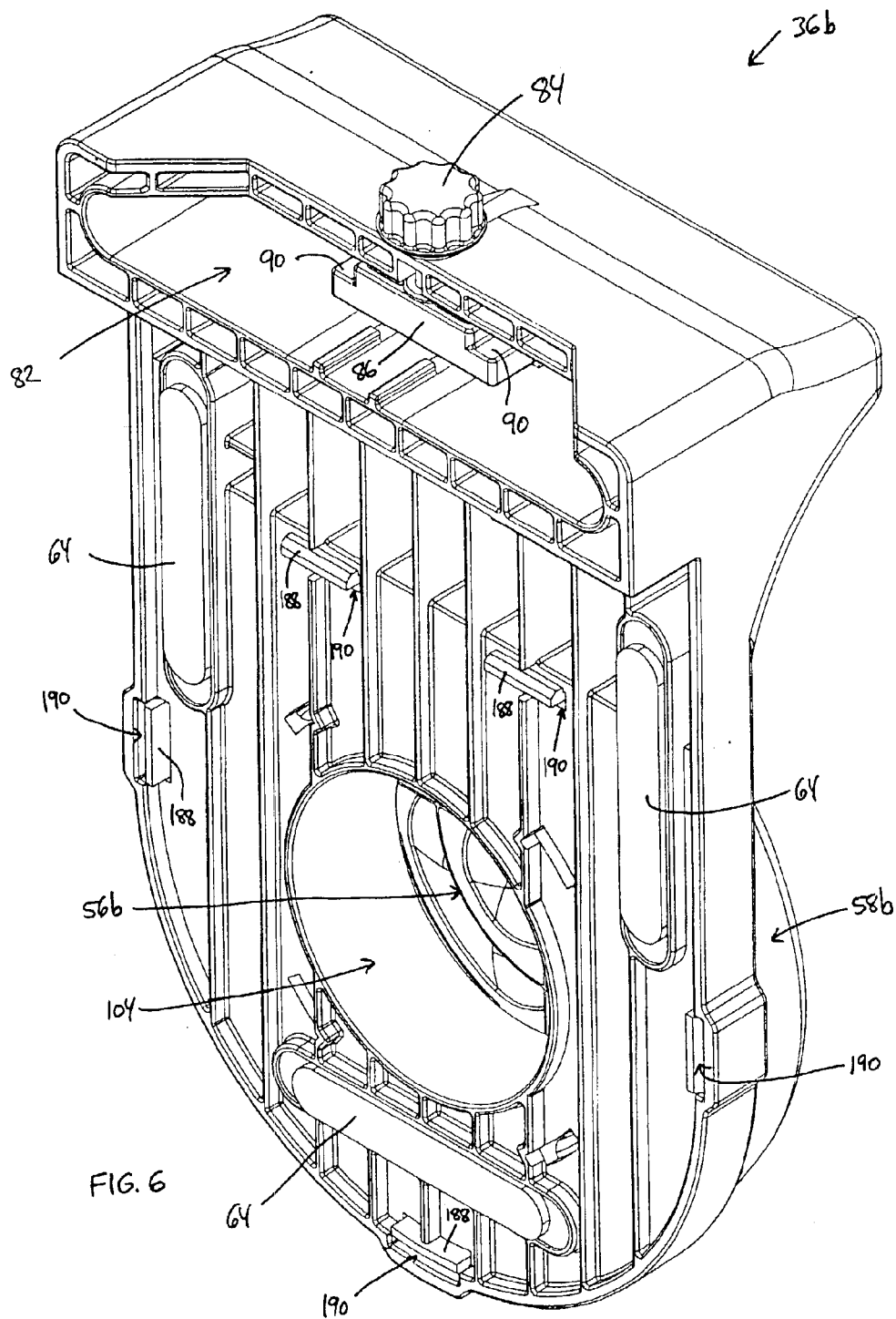
FIG. 6 is a perspective view of the first side panel taken from a second direction and shown with a ratchet wheel and cover in place.

Second side panel 36b is slidingly mounted on base 40. Second side panel 36b includes a base aperture 82 through which base bars 66a and b are inserted. A fastener handle 84 is included on second side panel 36b. Fastener handle 84 fits through an aperture 92 defined in side panel 36b and is attached to a threaded shaft inside of a retainer 86, (FIGS. 5 and 6). Retainer 86 includes a threaded aperture (not shown) which receives the threaded shaft of fastener handle 84. Rotation of fastener handle 84 therefore causes retainer 86 to move in one of the directions indicated by arrow 88 (FIG. 7), depending upon the direction of rotation of fastener handle 84. Retainer 86 includes two shoulders 90 which contact underside 78 of base bars 66a and b. When fastener handle 84 is rotated so that retainer 86 moves upwardly toward fastener handle 84, shoulders 90 will squeeze against underside 78 of base bars 66a and b. By tightening fastener handle 84, the frictional engagement of shoulders 90 with underside 78 will cause second side panel 36b to be locked in a given position along the length of base 40. Loosening fastener handle 84 will cause shoulders 90 to disengage from underside 78 of base bars 66a and b, thereby allowing second side panel 36b to slide along the length of base bars 66. Preferably, although not necessarily, second side panel 36b is slid along base bars 66a and b until it comes in contact with a side of computer unit 42. Thereafter, fastening handle 84 is tightened so that second side panel 36b remains in a position on base 40 in which it is in contact with computer unit 42. Retainer 86 is illustrated in more detail in FIG. 22.

Figure 7:
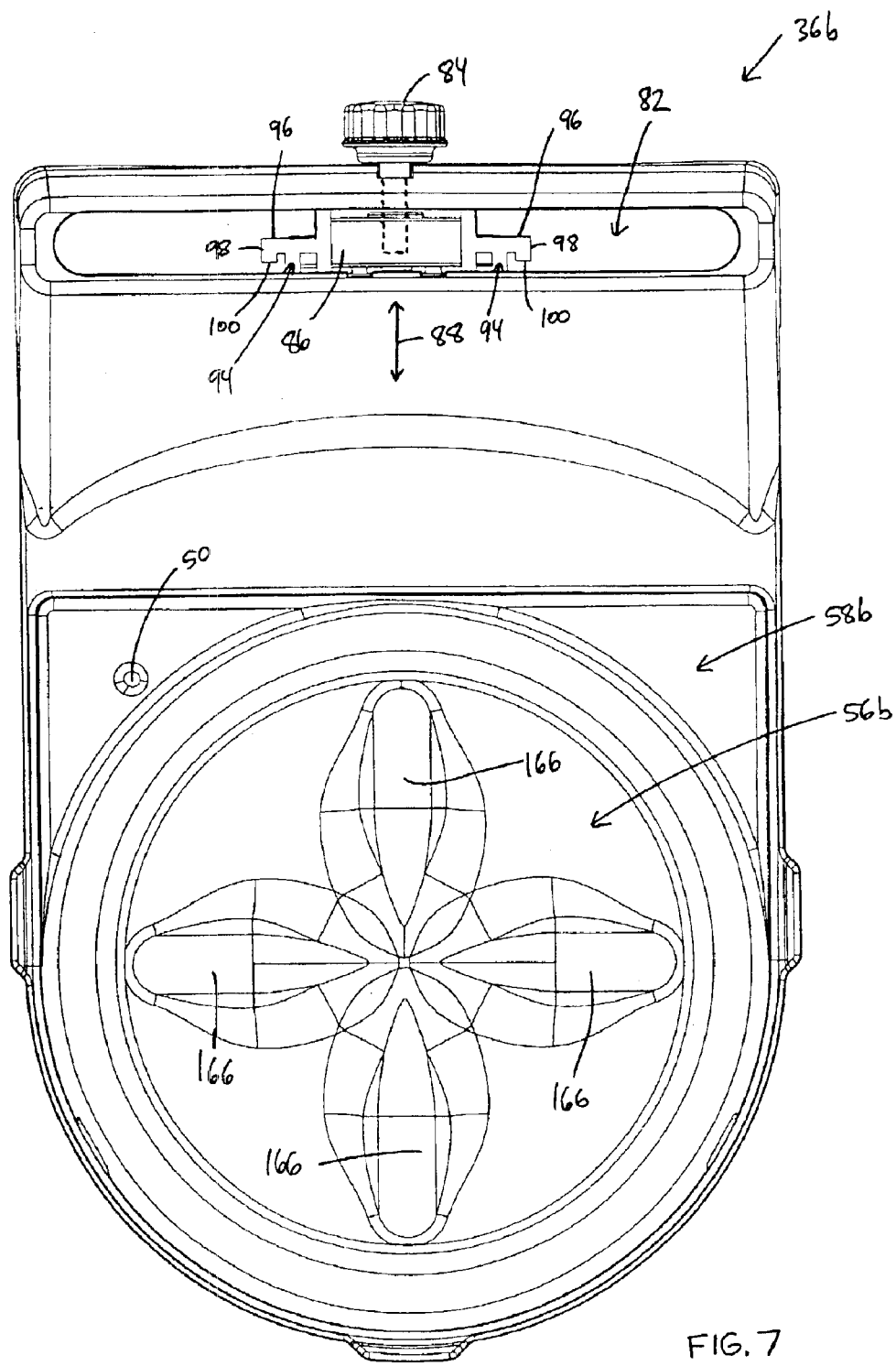
FIG. 7 is a side, elevational view of the side panel of FIG. 6.

Second end panel 36b includes an internal bearing member 94. Internal bearing member 94 extends only part way through base aperture 82. Each internal bearing member 94 includes a top surface 96, a side surface 98, and a bottom surface 100 (FIG. 7). These surfaces provide bearing surfaces that contact base 40 as side panel 36b slides back and forth along base 40. Second end panel 36b includes a cylindrical member 102 that surrounds an aperture 104 (FIGS. 5-6). Cylindrical member 102 includes an exterior surface 106 which provides a bearing surface about which ratchet wheel 54 rotates, as will be described more herein.

Figure 11:
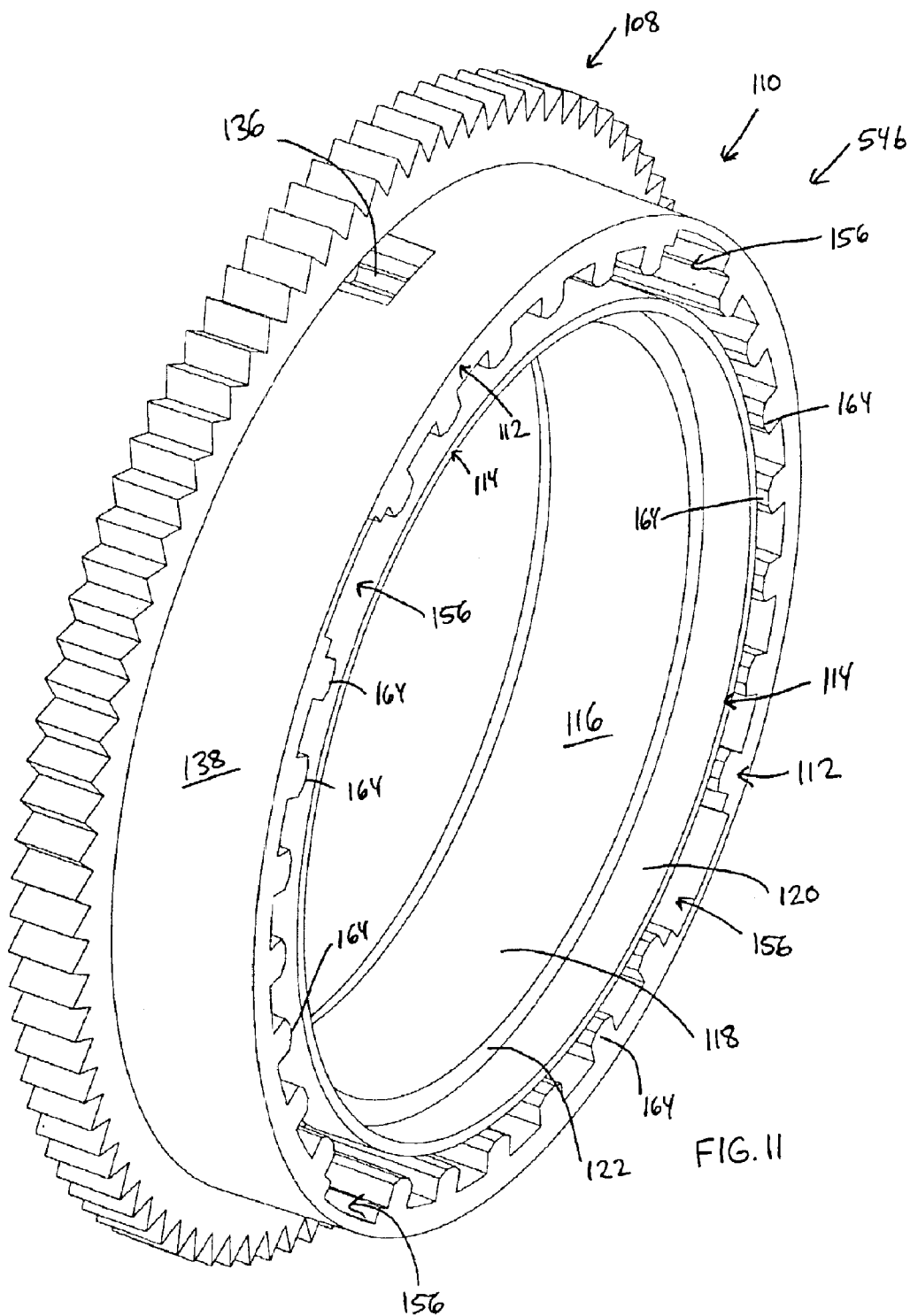
FIG. 11 is a perspective view of a ratchet wheel taken from a first direction.
Figure 12:
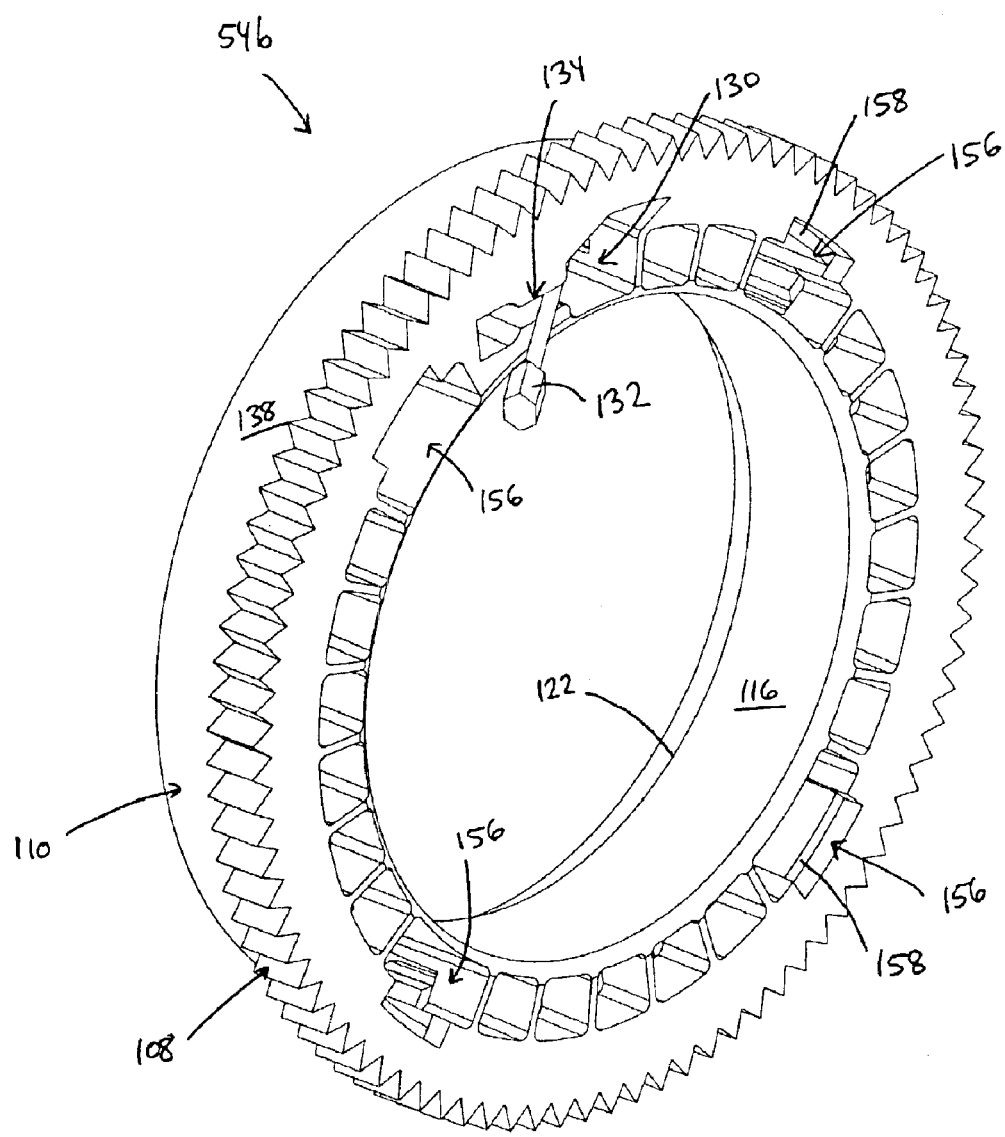
FIG. 12 is a perspective view of the ratchet wheel of FIG. 11 taken from a second direction.

Ratchet wheel 54 includes a gear portion 108 and a cylindrical portion 110 (FIGS. 11–12). Cylindrical portion 110 includes an outer cylindrical member 112 and an inner cylindrical member 114 that are arranged concentrically to each other. Inner cylindrical member 114 includes an interior surface 116. Interior surface 116 is made up of an inner portion 118 and an outer portion 120. The inner portion 118 defines a surface having a smaller radius than the surface defined by outer portion 120. This difference in radii defines an edge 122 between inner and outer portions 118 and 120. Edge 122 provides a structure for securing ratchet wheel 54 to side panel 36. Specifically, side panel 36 includes four flexible tabs 124 positioned generally about the circumference of cylindrical portion 110 (FIG. 5). Flexible tabs 124 each include a sloped surface 126 and a bottom surface 128. Flexible tabs 124 allow ratchet wheel 54 to be snap-fittingly attached to side panel 36. As ratchet wheel 54 is placed over cylindrical portion 110, sloped surfaces 126 contact inner portion 118 of inner cylindrical member 114 on ratchet wheel 54. Because of the sloped nature of sloped surface 126, as well as the relative position of flexible tabs 124 with respect to ratchet wheel 54, flexible tabs 124 are pushed inwardly towards each other as ratchet wheel 54 is pushed on to side panel 36. When ratchet wheel 54 is completely pushed onto side panel 36, flexible tabs 124 snap back to their un-flexed position. This is possible due to the greater radius of outer portion 120 as compared to inner portion 118. When flexible tabs 124 snap back to their un-flexed position, bottom surface 128 of flexible tabs 124 is in engagement with edge 122 of inner cylindrical member 114. This engagement between bottom surface 128 and edge 122 prevents ratchet wheel 54 from being removed from side panel 36, unless flexible tabs 124 are manually flexed so that bottom surfaces 128 come out of engagement with edge 122. Ratchet wheel 54 can thereby be easily and securely fastened to side panel 36 without the use of any separate fasteners.

Figure 9:
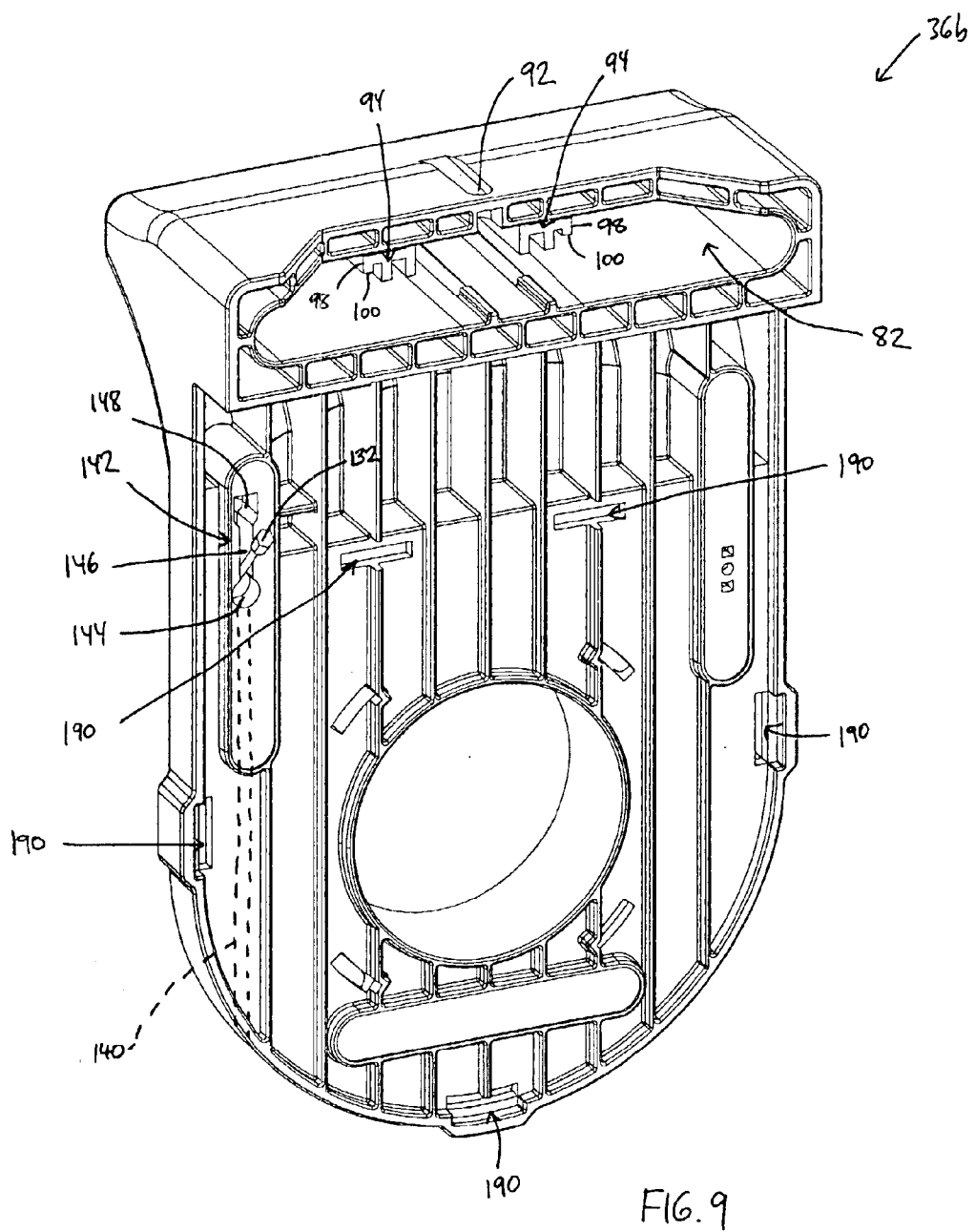
FIG. 9 is a perspective view of the first side panel illustrating a cable attachment structure.
Figure 10:
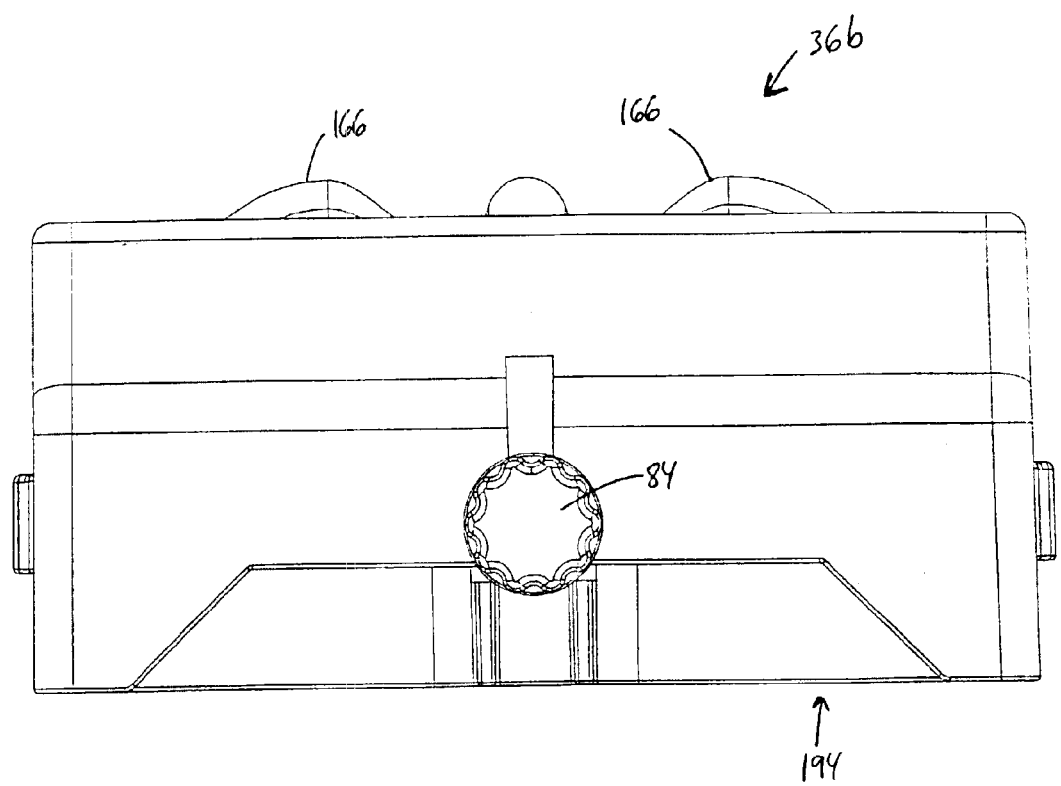
FIG. 10 is a plan view of the first side panel.

As illustrated in FIG. 12, ratchet wheel 54 includes a pocket 130 into which cable 34 is inserted. An enlarged head portion 132 is attached to one end of cable 34. Head portion 132 has a dimension that is thicker than a neck portion 134 of pocket 130. Thus, when head portion 132 is inserted into pocket 130, enlarged head portion 132 cannot travel through neck portion 134. One end of cable 34 is thereby secured to ratchet wheel 54. From pocket 130, cable 34 travels internally through ratchet wheel 54 to an opening 136 (FIG. 11). From opening 136, cable 34 travels around an exterior surface 138 of outer cylindrical member 112. Depending on how many times ratchet wheel 54 has been rotated, cable 34 wraps around exterior surface 138 one or more times, or merely contacts a portion of it. The unwrapped portion of cable 34 extends downward from ratchet wheel 54 and out of side panel 36, where it provides support to the computer unit. Cable 34 travels underneath the computer unit and is mounted around the exterior surface 138 of a ratchet wheel 54 on first side panel 36a. After looping over the exterior surface 138 of the ratchet wheel 54a in first side panel 36a, the cable exits out of first side panel 36a and travels again underneath the computer unit. It continues on up and back into second side panel 36b. Cable 34 is received in side panel 36b in a channel 140 (FIG. 9). Channel 140 extends vertically inside of side panel 36b up to an opening 142 at the top end of channel 140. Opening 142 includes a circular portion 144, a neck portion 146 and a head portion 148. The end of cable 34 that is secured in channel 140 also includes an enlarged head portion 132. Cable 34 is inserted through channel 140 and out of circular portion 144. The enlarged head portion is then placed back into head portion 148 of opening 142. Because the enlarged head portion 132 is of a greater dimension than neck portion 146, cable 34 cannot be retracted out of second side panel 36b. After cable 34 has been properly threaded through opening 142, a compressible pad 64 may be placed over opening 142.

Figure 13:
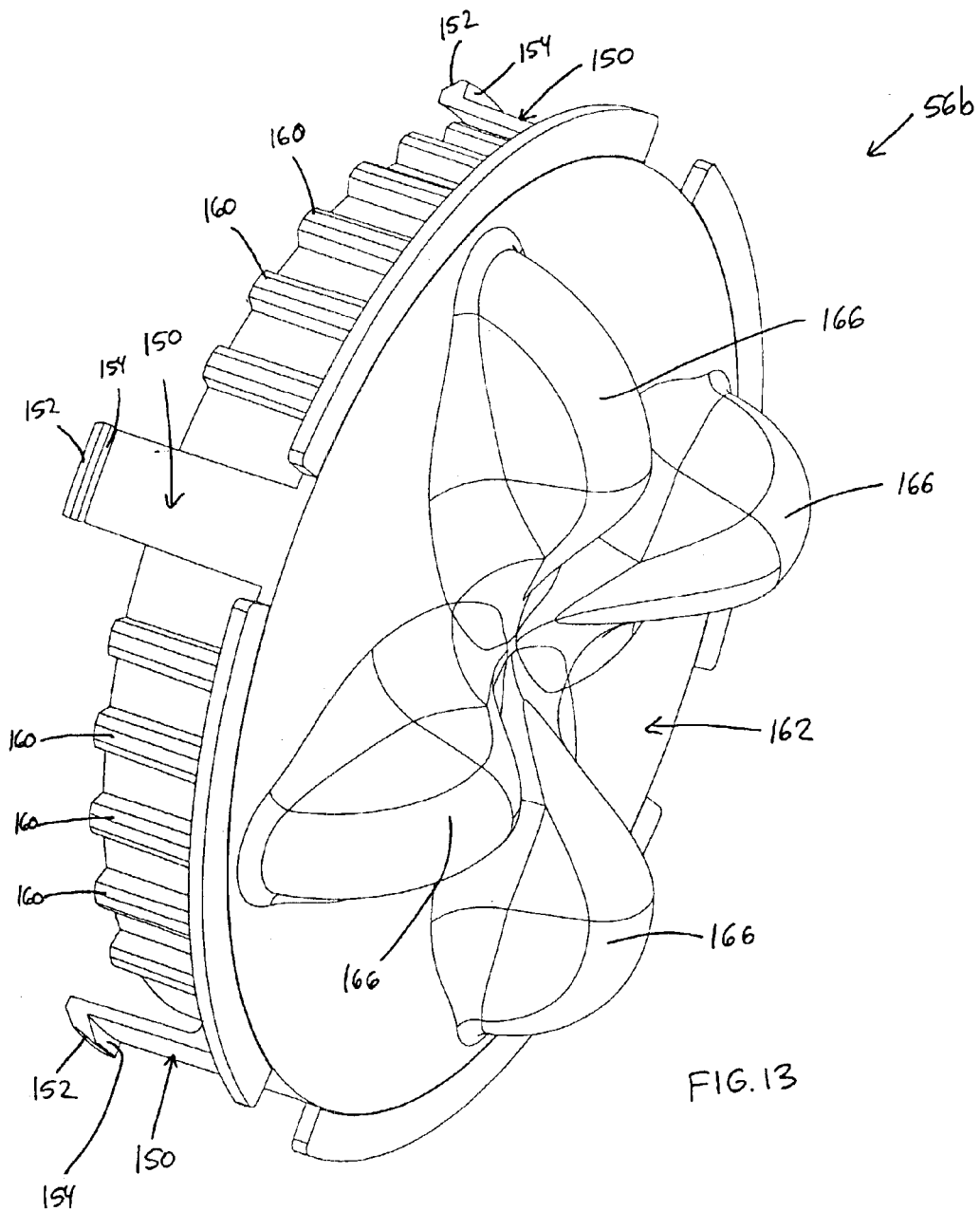
FIG. 13 is a perspective view of a ratchet handle.

Ratchet handle 56 is also secured to ratchet wheel 54 in a snap-fitting manner. As illustrated in FIG. 13, ratchet handle 56 includes a plurality of flexible tabs 150. Each flexible tab 150 includes a sloped surface 152 and a bottom surface 154. Ratchet handle 56 is secured to ratchet wheel 54 by inserting flexible tabs 150 into respective openings 156 defined in ratchet wheel 54 (FIG. 12). As flexible tabs 150 are inserted therein, sloped surface 152 contacts a side of openings 156 and is flexed radially inwardly. This inward flexing continues until ratchet handle 56 is fully attached to ratchet wheel 54. At that moment, flexible tabs 150 snap back to their un-flexed position. Bottom surfaces 154 of flexible tabs 150 contact a shoulder surface 158 in this un-flexed position. The engagement of shoulder surface 158 and bottom surface 154 of flexible tabs 150 prevent ratchet handle 56 from being removed from ratchet wheel 54. Ratchet handle 56 includes a number of external ribs 160 positioned about a cylindrical body portion 162. Ribs 160 fit in between a plurality of ribs 164 defined on an interior surface of outer cylindrical member 112 of ratchet wheel 54. The interaction of ribs 160 and 164 ensures that when ratchet handle 56 is rotated, this causes a corresponding rotation of ratchet wheel 54. The rotation of ratchet handle 56 is facilitated by four gripping surfaces 166. Gripping surfaces 166 provide a surface for a user to grab a hold of and manually rotate ratchet handle 56, as well as ratchet wheel 54.

Pawl 62 is depicted in FIG. 5 in exploded form. Pawl 62 consists of a first half 168 and a second half 170. Each half of pawl 62 includes a flexible spring portion 172, a shaft aperture 174, and a gripping edge 176. Shaft apertures 174 are inserted over a pawl shaft 178 defined on second side panel 36b. Pawl shaft 178 includes an end member 180 that extends radially outward a greater distance than the circumference of the main portion of pawl shaft 178. In order to insert pawl 62 onto pawl shaft 178, shaft apertures 174, which include accommodations for end member 180, must be properly aligned with shaft aperture 174 and end member 180. Once inserted onto shaft aperture 174, pawl 62 is slightly rotated so that end member 180 serves to secure first and second halves 168 and 170 on pawl shaft 178. When secured on pawl shaft 178, flexible spring portions 172 contact an upper surface 182 defined on second side member 36b. Flexible spring portion 172 and upper surface 182 are dimensioned and positioned so that first and second halves 168 and 170 are biased towards and against the teeth of ratchet wheel 54b. Specifically, gripping edges 176 are biased in between the teeth of ratchet wheel 54. Because of this biasing, as well as the shape and position of pawl 62, ratchet wheel 54 is only permitted to rotate in one direction. This direction is one in which cable 34 becomes more and more wrapped around ratchet wheel 54b. Rotation of ratchet wheel 54b in this direction thereby causes the length of the exposed portion of cable 34 to be decreased. This tightens cable 34 against any computer unit 42 that may be positioned inside of and held by computer unit holder 30.

First half 168 of pawl 62 includes a keyway aperture 184. When first half 168 of pawl 62 is positioned on pawl shaft 178, keyway aperture 184 is aligned with keyway 50 defined in ratchet cover 58. A user can therefore insert a key through keyway 50 and into keyway aperture 184. After a key is so inserted, the key can be pivoted so as to exert a force on pawl 62 that moves the griping edges 176 out of contact with the teeth on ratchet wheel 54. The insertion and manipulation of the key thereby temporarily disengages pawl 62 from ratchet wheel 54. When so disengaged, ratchet wheel 54 can be rotated in an opposite direction in which the length of the exposed portion of cable 34 can be increased. When a person desires to remove a computer unit from computer unit holder 30, the insertion of a key into keyway 50, along with the manipulation of the key, allows more cable to be exposed, thereby creating enough slack so that computer unit 42 can be removed from holder 30.

In the illustrated embodiment, keyway 50 and keyway aperture 184 are simply cylindrically shaped. Preferably, although not necessarily, the diameter of keyway 50 and keyway aperture 184 are smaller than a typical pen or pencil, or other readily available office items. In this way, readily available office supplies cannot be used to disengage and remove a computer from holder 30. While other diameters are possible, keyway 50 and keyway aperture 184 may have a diameter of 2–3 millimeters. The key that is inserted into keyway 50 and keyway aperture 184 may be any rigid, elongated member that has a sufficiently small diameter to fit inside of these apertures. An Allen wrench having a diameter of 2 millimeters is one tool that can be used as a key. Allen wrenches having different dimensions can also be used. Further, other tools besides Allen wrenches can be used as keys. Preferably, although not necessarily, the key has a length of more than two inches. This length provides greater leverage after the key has been inserted into keyway aperture 184. This greater leverage decreases the amount of force that a user has to exert to overcome the tensioning force of flexible spring portion 172 of pawl 62.

Figure 14:
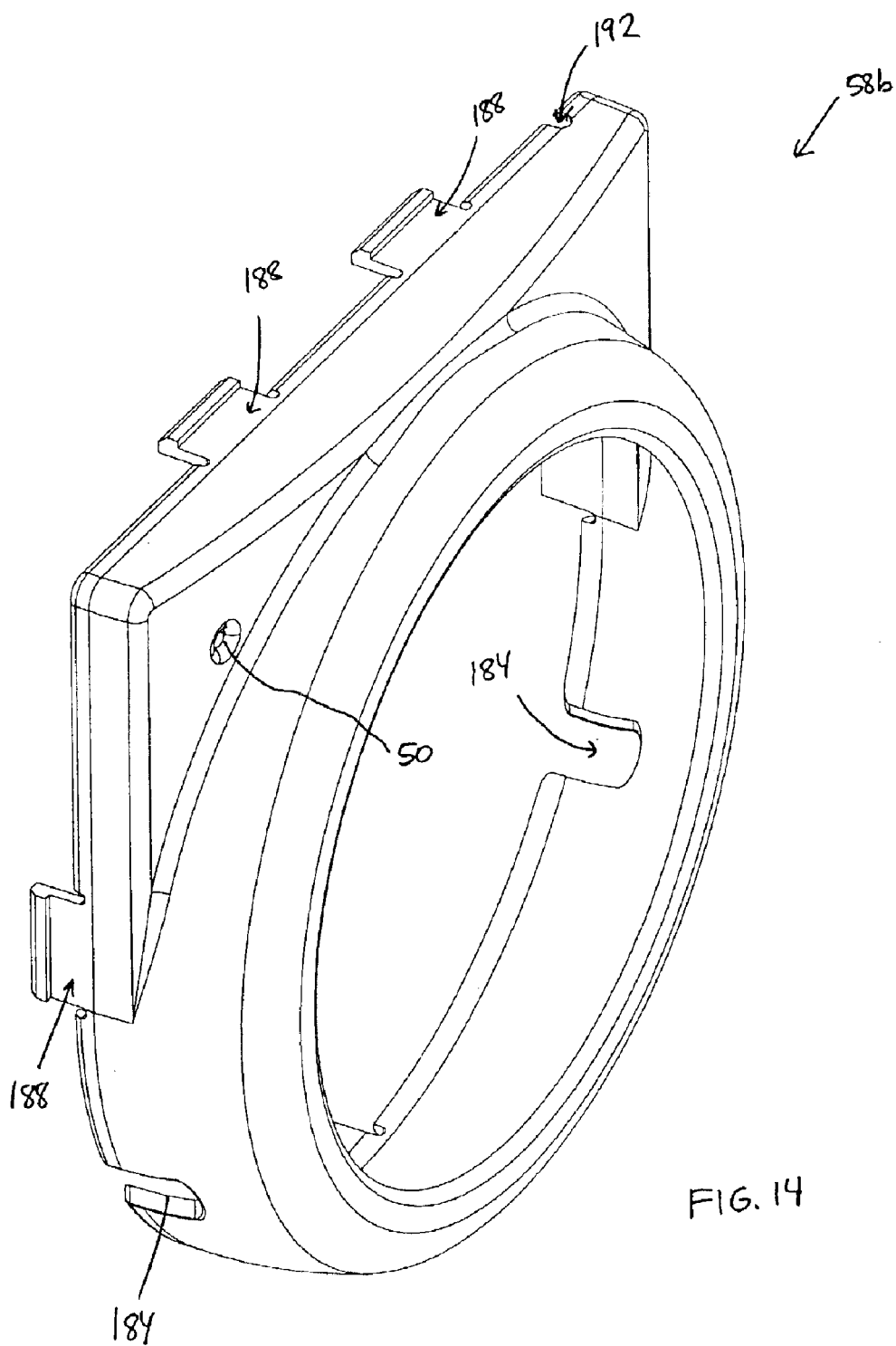
FIG. 14 is a perspective view of a ratchet cover.

Ratchet cover 58 includes two slots 186 that provide an exit for cable 34 as it comes off of ratchet wheel 54 (FIG. 14). Ratchet cover 58 is also snap fittingly secured to side panel 36. Ratchet cover 58 includes a plurality of flexible tabs 188. Flexible tabs 188 allow ratchet cover 58 to be snap fittingly secured to side panel 36 in the same manner that the other flexible tabs 124 and 150 do. Flexible tabs 188 fit into corresponding attachment slots 190 defined in side panel 36 (FIG. 9). As flexible tabs 188 are inserted into attachment slots 190, they flex inwardly. After being fully received in attachment slots 190, they snap back to their un-flexed position. This retains ratchet cover 58 on side panel 36 and it conceals ratchet wheel 54. Access to ratchet wheel 54 is not permitted other than through keyway 50, as has been described above. Ratchet cover 58 further includes a slot 192 defined along the edge of its top surface (FIG. 14). Slot 192 accommodates the end of cable 34 that is secured in opening 142.

Figure 8:
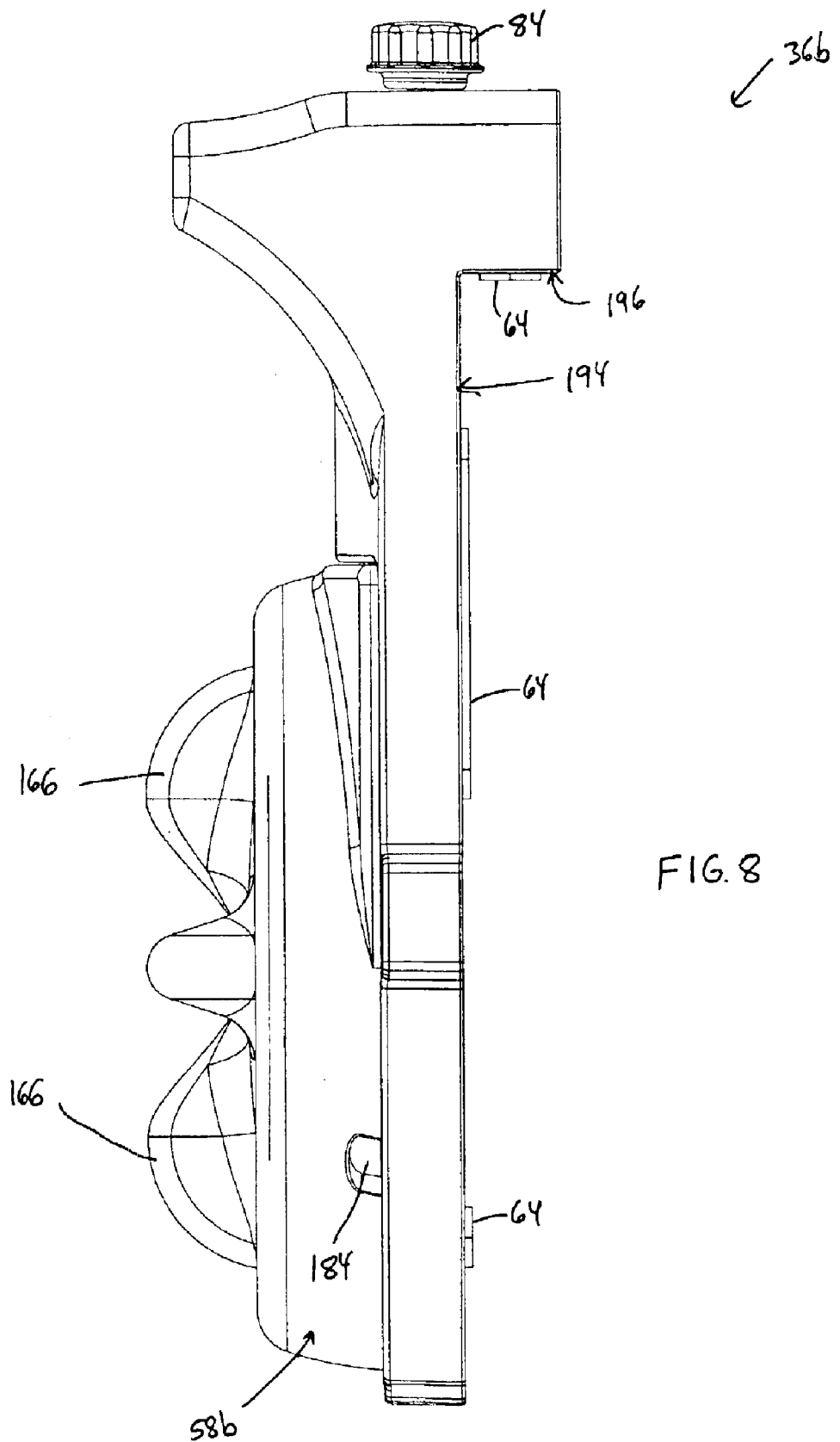
FIG. 8 is a front, elevational view of the first side panel of FIG. 7.

Side panels 36a and b may include a number of compressible pads 64 that are positioned to be in contact with a computer held by computer holder 30. Side panels 36 include an interior surface or side 194 on which three compressible pads 64 may be placed. Compressible pads 64 are secured to side panel 36 by way of a suitable adhesive. In the illustration of FIG. 9, only two of the compressible pads 64 are secured to interior side 194. The third compressible pad has been removed to illustrate the position of opening 142. A third compressible pad 64 can be placed over this opening. Side panel 36 also includes a bottom surface 196 on which one or more compressible pads 64 may be placed (FIG. 8). Compressible pads 64 help to prevent scratching or marring of the outer surface of computer unit 42. They also help provide a frictional grip against computer unit 42 when cable 34 has been tightened.

Figure 15:
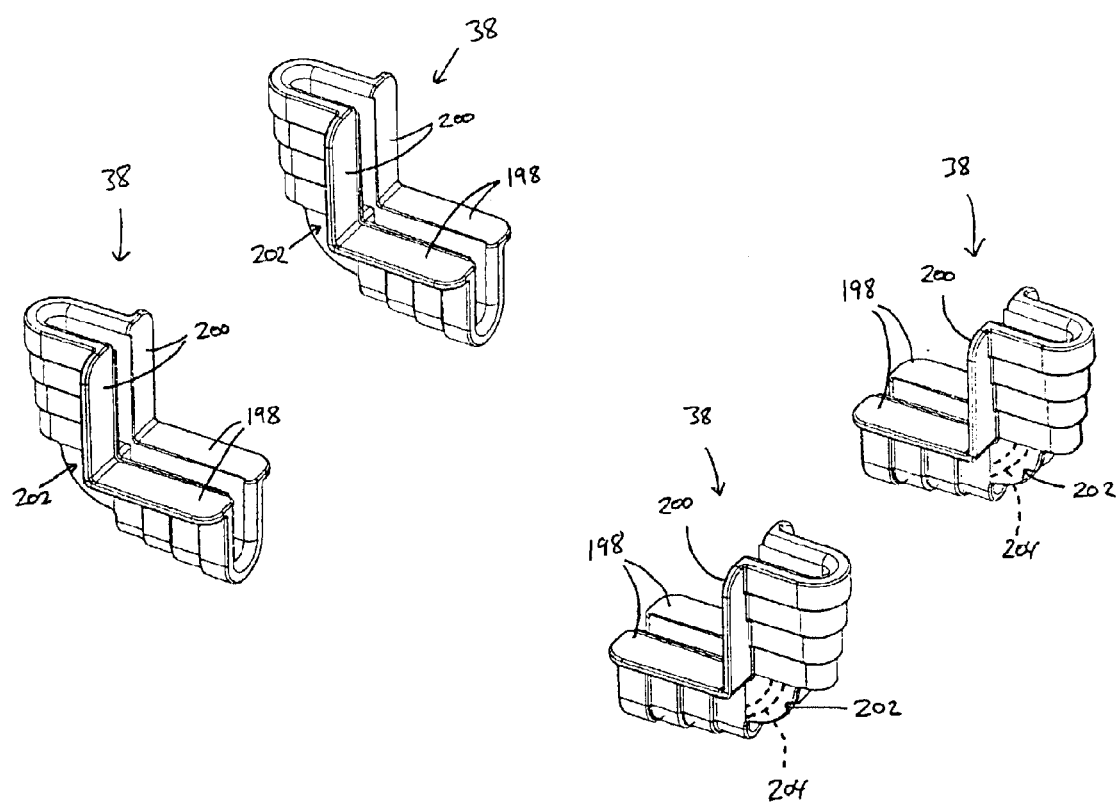
FIG. 15 is a perspective view of four cable guides.

Four cable guides 38 are illustrated in FIG. 15. Each cable guide 38 includes a horizontal surface 198 and a vertical surface 200. Horizontal surfaces 198 and vertical surfaces 200 meet each other at a right angle. A compressible pad 64 may be placed on each surface 198 and 200. Cable guides 38 each include a corner portion 202. A channel 204 is defined in corner portion 202. Cable 34 is threaded through channel 204. When so threaded, cable guides 38 cannot be removed from cable 34 without removing cable 34 out of channel 204. Horizontal and vertical surfaces 198 and 200 are adapted to be in contact with the exterior surface of the computer unit held by computer unit holder 30. Cable guides 38 are thus particularly suited for supporting computer units 42 that have square cornered bottoms. To the extent computer unit 42 does not have a square cornered bottom, computer unit holder 30 can still be used to support the computer unit, either with or without cable guides 38.

Figure 16:
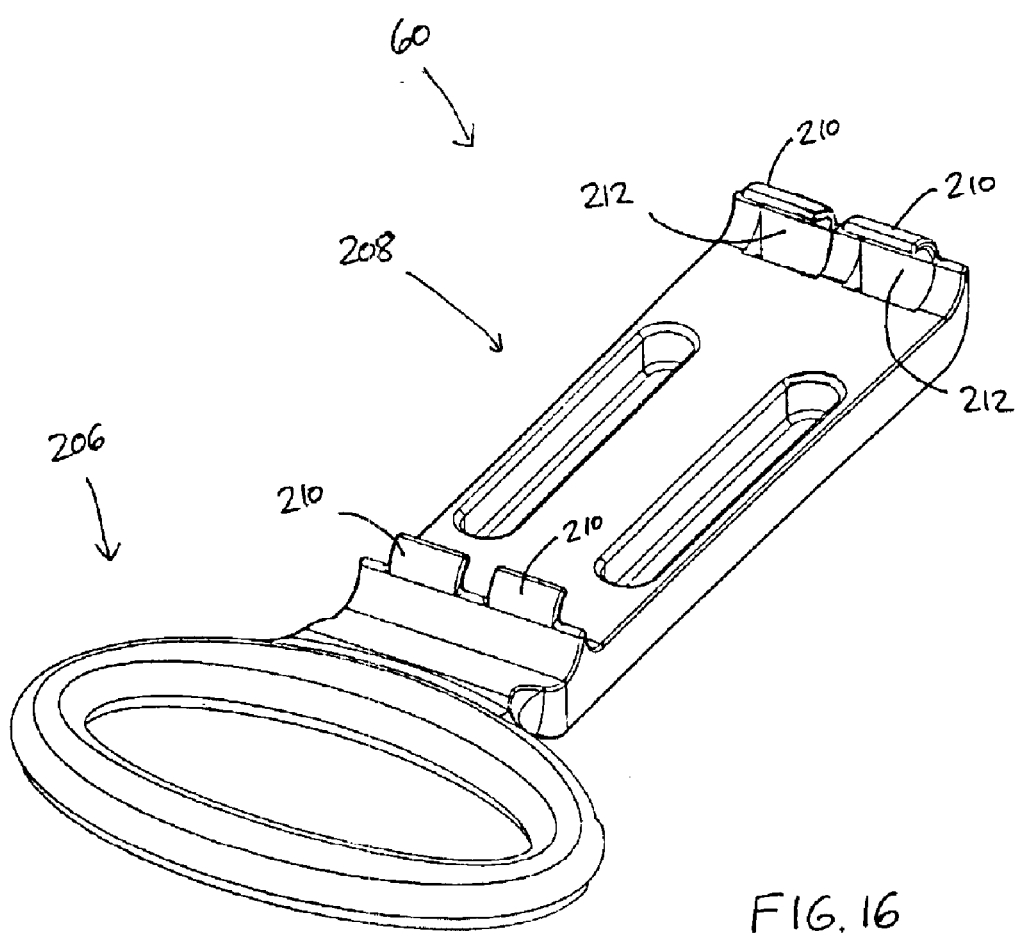
FIG. 16 is a perspective view of a handle.

Computer unit holder 30 may include a handle 60 that attaches to base 40 for facilitating the manipulation of computer unit holder 30 (FIG. 16). Handle 60 may include a circular gripping portion 206 and an attachment portion 208. Attachment portion 208 includes four flexible tabs 210. A pair of these flexible tabs 210 are positioned at each end of attachment portion 208. Flexible tabs 210 include an interior surface 212 that is curved to generally match the curvature of exterior side 74 of base bars 66a and b. Handle 60 is secured to the underside of base 40 by positioning the flexible tabs 210 that are farthest away from gripping portion 206 around the exterior side 74 of one of the base bars 66a and b. Then, the other set of flexible tabs 210 are pushed upwardly against base 40. This upward movement causes these tabs to flex outwardly and around exterior side 74 of the opposite base bars 66a and b. When pressed fully against base 40, flexible tabs 210 return to their un-flexed position. Handle 60 is thus secured to base 40. Removal of handle 60 from base 40 requires the physical manipulation of flexible tabs 210. Handle 60 is preferably attached to base 40 such that gripping portion 206 extends forwardly from base 40. That is, gripping portion 206 should be positioned above the front end of computer unit 42. Handle 60 allows a user to easily pull computer unit holder 30 toward themselves when computer unit holder 30 is mounted in a sliding tray, as will be discussed more below. Further, handle 60 allows a user to easily rotate computer unit holder 30 about vertical axis 48.

Figure 17:
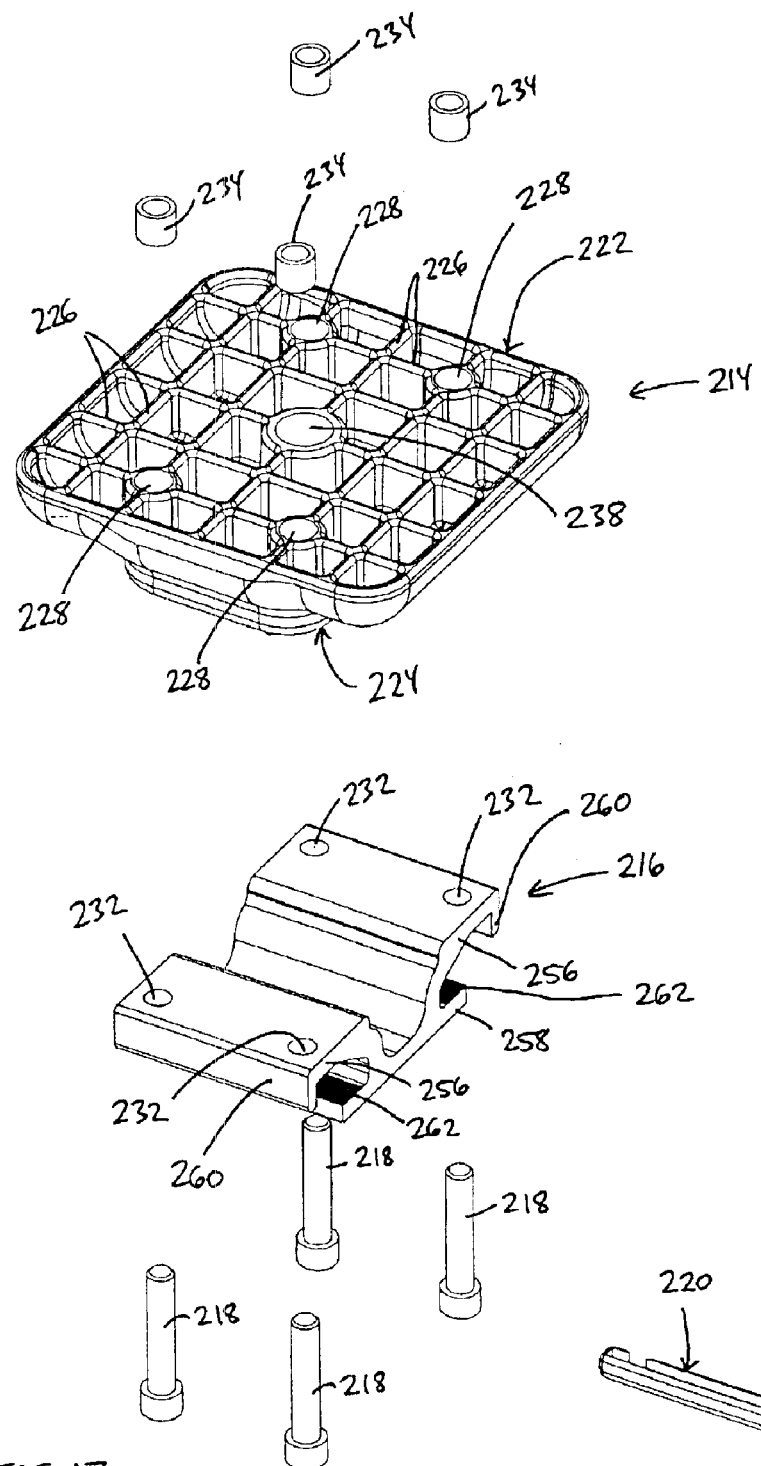
FIG. 17 is a perspective, exploded view of various components of a mount.
Figure 18:
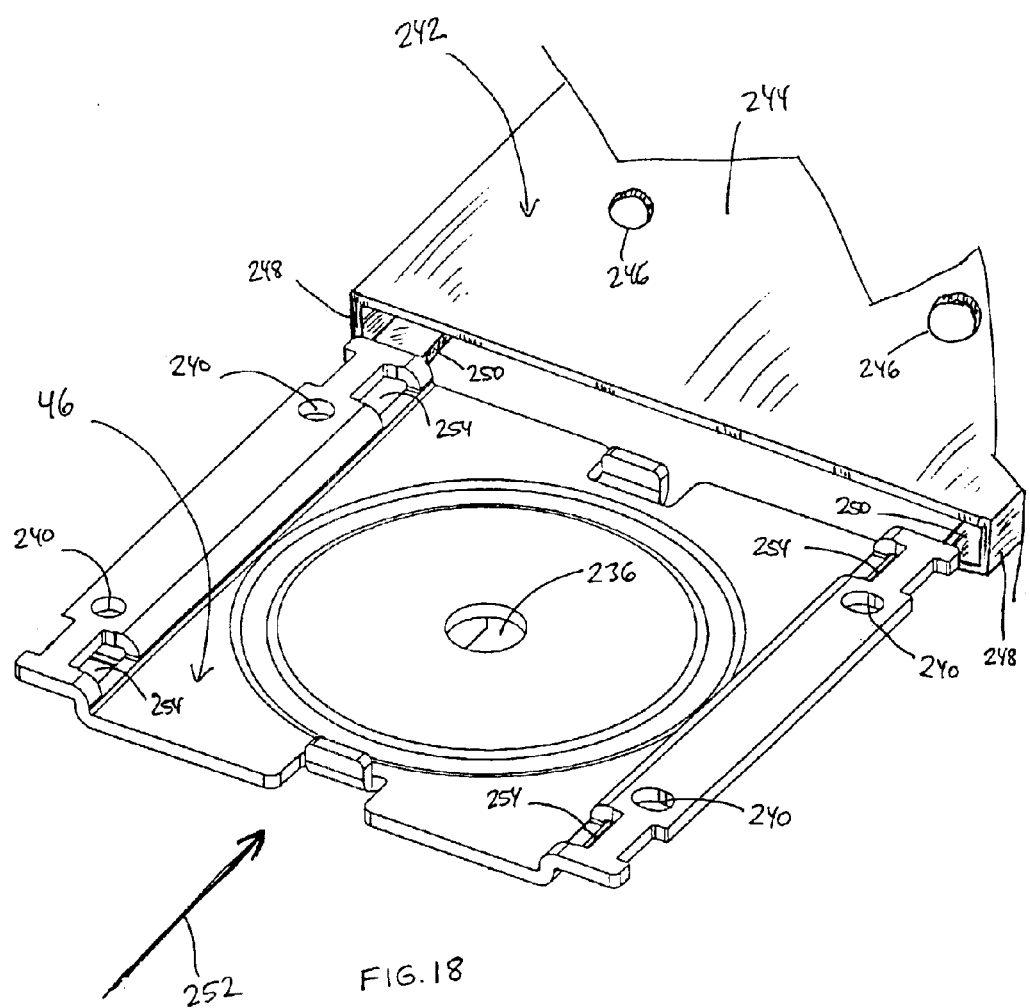
FIG. 18 is a perspective view of a mounting plate.

The various components of mount 32 are depicted in more detail in FIGS. 17 and 18. Mount 32 includes a mount body 214, a mounting bracket 216, mounting plate 46, a plurality of fasteners 218, and a pair of elongated bearings 220. Mount body 214 includes a top side 222 and a bottom side 224. Mount body 214 may be made of a molded plastic material, and include a plurality of internal ribs 226 that facilitate the molding of body 214, as well as provide it with sufficient structural strength. Mount body 214 includes four fastener holes 228 that receive four bolts 218, or other suitable types of fasteners. Bolts 218 pass through corresponding fastener holes 232 in mounting bracket 216. Bolts 218 thus secure mounting bracket 216 to the bottom side 224 of mount body 214. A plurality of nuts 234 may be inserted into holes 228 to threadingly receive and attach to bolts 218.

Mounting plate 46 is secured to the top side of 222 of mount body 214 by way of a vertically oriented bolt that passes through a center hole 236 in mounting plate 46, as well as a center hole 238 defined in mount body 214. A nut (not shown) may be used on the bolt, or other type of fastener that is used to secure mounting plate 46 to mount body 214. A plurality of washers (not shown) may be positioned on the top and bottom sides 222 and 224 as well as on the top of mounting plate 46. The fastener used to secure mounting plate 46 to mount body 214 may be a pivot bolt having a socket head. The washers used in conjunction with the bolt may be low friction nylon washers, or other similar types of washers. A nut is attached to the bolt and tightened sufficiently to maintain mounting plate 46 to mount body 214, yet allow mount body 214 to rotate with respect to mounting plate 46. This rotation takes place about vertical axis 48, which passes through center holes 236 and 238. Thus, mounting plate 46 will remain in a stationary orientation when mount body 214, as well as the rest of computer unit holder 30, is rotated about vertical axis 48.

Plate 46 may be attached to a stationary structure 41 in at least two different manners. As illustrated in FIG. 18, mounting plate 46 includes four fastener apertures 240. Screws may be inserted through fastener apertures 240 and drilled directly into the underside of whatever stationary structure computer unit holder 30 is to be mounted to. When computer unit holder 30 is mounted in this manner, the holder is only capable of rotational movement. Linear movement of the holder is not permitted. Linear movement, however, can be permitted by use of a sliding tray 242 (FIG. 18). Sliding tray 242 includes a top wall 244 in which a plurality of fastener apertures 246 may be defined. Fastener apertures 246 receive screws, or other types of fasteners, that are used to stationarily secure sliding tray 242 to the underside of stationary structure 41. Sliding tray 242 includes two side walls 248 and two horizontal flanges 250. Side walls 248 are horizontally spaced apart slightly greater than the horizontal extent of mounting plate 46 to thereby allow mounting plate 46 to be inserted between side walls 248. Horizontal flanges 250 extend inwardly toward each other a sufficient distance such that, when mounting plate 46 is positioned between side walls 248, horizontal flanges 250 prevent mounting plate 46 from falling out of sliding tray 242. Mounting plate 46 can thus slide linearly within sliding tray 242 in a direction parallel to arrow 252 (FIG. 18). The length of sliding tray 242 can be made to any desirable length. This length will determine the degree of linear movement of computer unit holder 30. In some situations it may be desirable to move computer unit 42 a great distance underneath a desk, or other stationary structure, when it is not in use. In such situations, a longer sliding tray 242 can be utilized. When a user desires to utilize computer unit 42, he or she can grab handle 60 and pull computer unit holder 30 toward themselves. This movement will be accommodated by the sliding of mounting plate 46 in sliding tray 242.

In order to facilitate the sliding movement of mounting plate 46 in sliding tray 242, four bearing mount holes 254 are provided in mounting plate 46 (FIG. 18). Bearing mount holes 254 are dimensioned and configured to receive bearing members, which may comprise elongated strips of tough, flexible plastic material, which preferably have a low coefficient of friction. Bearing mount holes 254 are particularly suited to receive the type of bearings that are described in U.S. Pat. No. 6,409,127 issued to Vander Heide et al., and identified therein by reference numeral 80. The disclosure of this Vander Heide et al. patent is incorporated herein in its entirety by reference.

Figure 19:
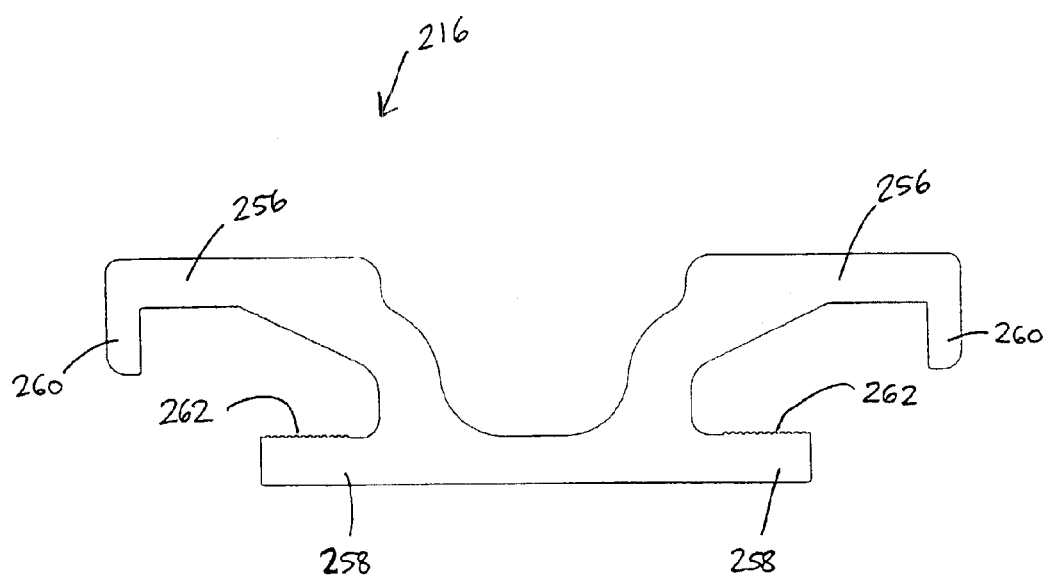
FIG. 19 is a side, elevational view of a mounting bracket.

Mounting bracket 216 includes a pair of upper arms 256 and lower arms 258 (FIG. 19). A downwardly depending flange 260 is positioned at the end of each of upper arms 256. Elongated bearings 220 (FIG. 17) fit onto each of flanges 260. Elongated bearings 220 are preferably made of a relatively low friction, plastic material. They are dimensioned to be frictionally retained on flanges 260. The undersides of elongated bearings 220 contact, and slide along, top surfaces 68 of base bars 66a and b, when computer unit holder 30 is fully assembled. Elongated bearings 220 generally prevent scratching between mounting bracket 216 and base bars 66, both of which may be manufactured of extruded aluminum. Lower arms 258 of mounting bracket 216 include an upper, roughened surface 262. Surface 262 contacts the underside of base bars 66a and b. The roughened nature of surface 262 helps prevent mounting bracket 216 from sliding too easily along the length of base bars 66. This sliding movement of mounting bracket 216 along base bars 66 allows a user to position mount 32 precisely above the center of computer unit 42. This ensures that the loads and stresses placed on mount 32 will generally be uniform. This allows computer unit holder 30 to be more solidly and securely attached to the stationary structure 41.

Figure 20:
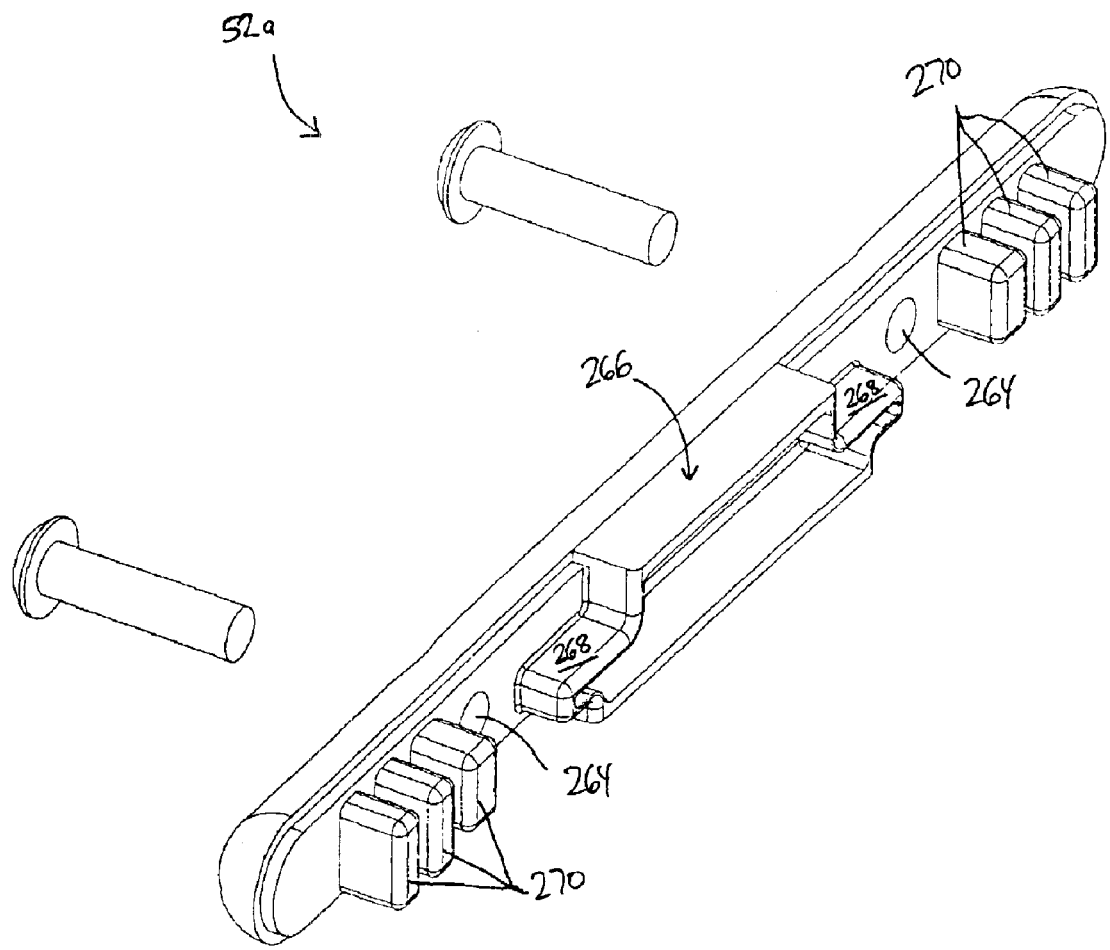
FIG. 20 is a perspective view of a first end cap.
Figure 21:
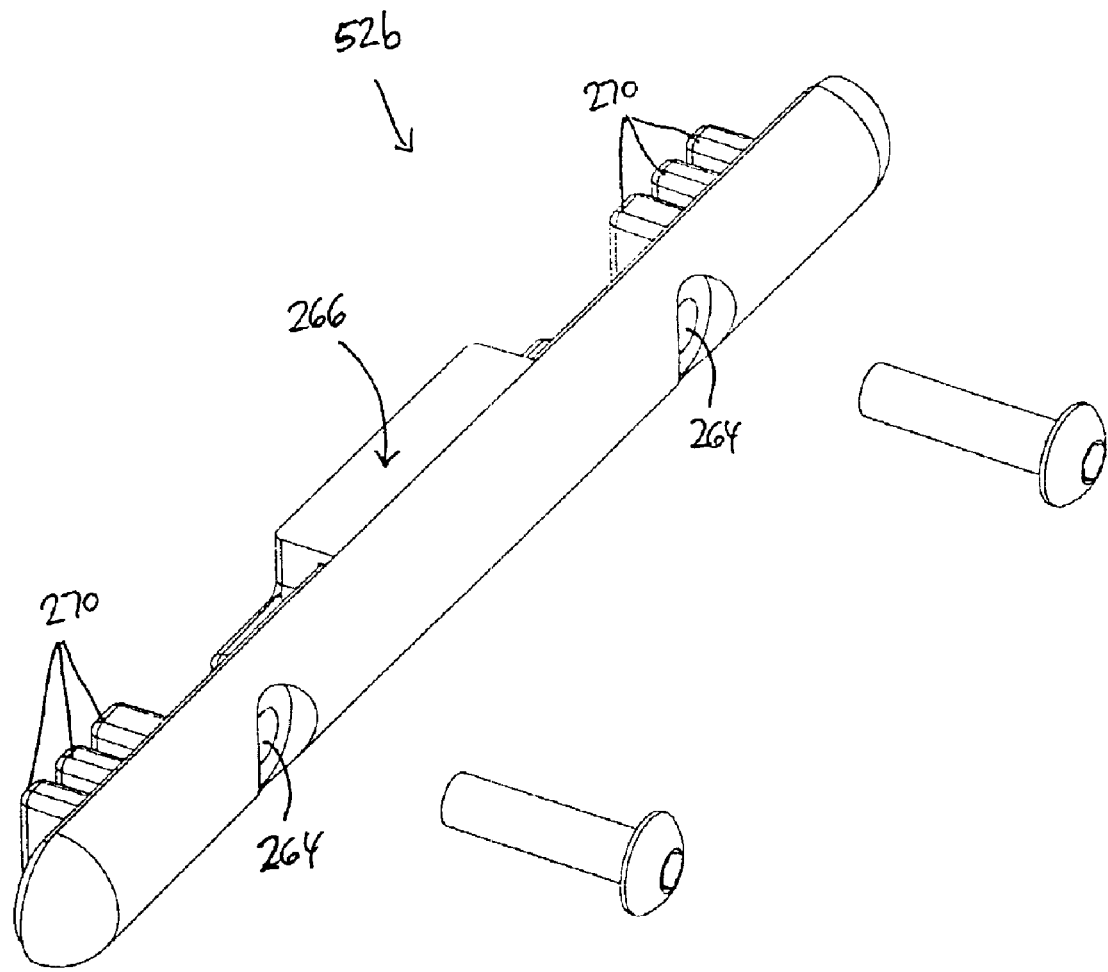
FIG. 21 is a perspective view of a second end cap.

Base bars 66a and b are secured together in spaced relation by a pair of end caps 52a and b (FIGS. 20 and 21). Each end cap 52 includes a pair of fastener holes 264. Screws, or other types of fasteners, are inserted through fastener holes 264 and into screw holes 80 defined in base bars 66a and b. End caps 52 are thereby secured to base bars 66a and b. End caps 52 maintain base bars 66a and b in a spaced relationship by way of separator portions 266. Separator portions 266 fit between each of the base bars 66. Separator 266 has an exterior surface 268 that is shaped generally to match the shape of interior side 72 of base bars 66. End caps 52 further include a number of ribs 270 that fit in between corresponding ribs defined along base bars 66.

Figure 22:
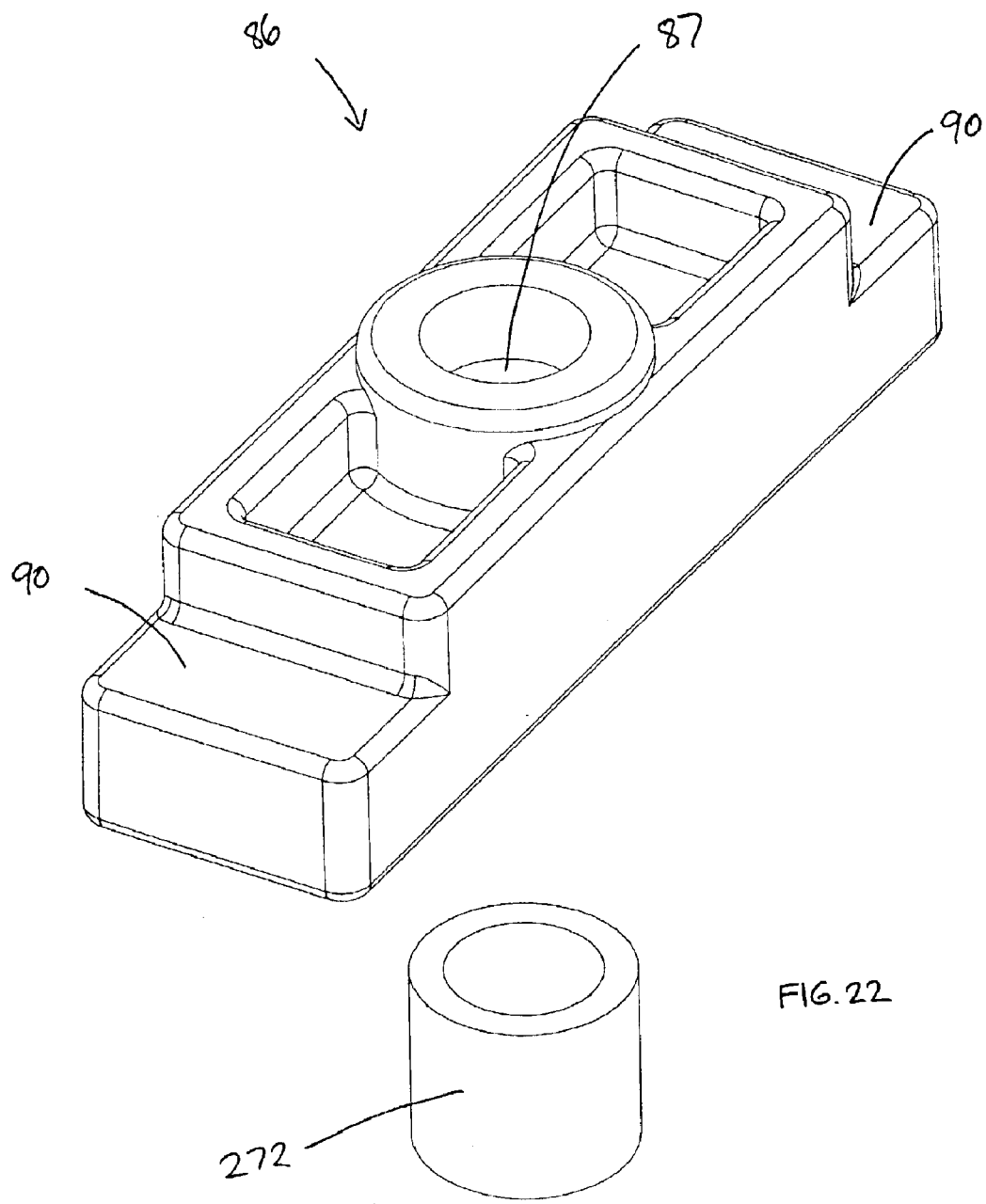
FIG. 22 is a perspective view of a retainer.

Retainer 86 is depicted in more detail in FIG. 22. Retainer 86 includes shoulders 90 that contact the underside 78 of flange 76 of base bars 66, as has been described previously. Retainer 86 includes a central aperture 87 that receives a fastener from either fastener handle 84, or another type of fastener. A nut 272 may be used to secure the fastener to retainer 86. In the illustrated embodiment, second side panel 36b includes a fastener handle 84 that is received in central aperture 87 of retainer 86. First side panel 36a is illustrated as simply using a screw, or other type of fastener, to secure first side panel 36a to base 40 by way of retainer 86. First side panel 36a therefore remains stationary along the length of base 40 in the illustrated embodiment. The spacing between first and second side panels 36a and b is therefore most easily adjusted by loosening fastener handle 84 and moving second side panel 36b. If desired, computer unit holder 30 could be manufactured to include two fastener handles 84, one on each of first and second side panels 36a and b. Movement of only a single side panel 36, however, is sufficient to provide all the necessary adjustability to computer unit holder 30.

While the foregoing description of side panels 36 has primarily been specifically directed to second side panel 36b, the construction of first side panel 36a is identical to second side panel 36b in all respects but one. The one difference is that first side panel 36a does not include a pawl 62. Rotating ratchet wheel 54 in first side panel 36a therefore does not alter the length of the exposed portion of cable 34. The rotation of ratchet wheel 54a simply has no effect. Adjustments to the length of the exposed portion of cable 34 are made solely by way of ratchet wheel 54b and second side panel 36b. The two ends of cable 34 are secured in second side panel 36b, while cable 34 is simply looped over ratchet wheel 54a in first side panel 36a.

As has been discussed previously, base 40 and mounting bracket 216 may be manufactured from extruded aluminum. Side panels 36a and b may be constructed entirely from plastic. Pawl 62, ratchet wheels 54, ratchet handles 56, and ratchet covers 58 may likewise be constructed entirely of plastic. Further, end caps 52, cable guides 38, and mount body 214 may also be constructed of plastic. Mounting plate 46 is preferably constructed of steel, or other suitable material. Retainers 86 may also be constructed of plastic.

While the present invention has been described in terms of the embodiments discussed in the above specification, it will be understood by one skilled in the art that the present in invention is not limited to these particular embodiments, but includes any and all modifications that are within the spirit and scope of the present invention that is defined in the appended claims.

What is claimed is:

1. A computer unit holder comprising:
   a base;
   an elongated flexible member supported by said base, said elongated flexible member being a length sufficient to extend underneath a computer unit positioned underneath said base;
   an adjustment mechanism for adjusting the distance which said elongated flexible member extends downwardly from said base, said adjustment mechanism including a lock adapted to allow said distance of said elongated flexible member to be decreased but not increased; and
   a keyway in communication with said lock, said keyway adapted to allow a key to be inserted therein and to unlock said lock so that the distance said elongated flexible member extends downwardly from said base when the key is inserted into said keyway can be increased.

2. The holder of claim 1 wherein said elongated flexible member is a cable.

3. The holder of claim 2 wherein a majority of said cable underneath said adjustment mechanism is free from contact with any rigid structure other than the computer unit supported by said cable whereby said cable is free to flex to a shape of a computer unit supported by said cable.

4. The holder of claim 2 wherein said adjustment mechanism includes a ratchet wheel and said lock includes a pawl operably connected to said ratchet wheel.

5. The holder of claim 2 further including a mount attached to a side of said base opposite said cable, said mount adapted to allow said base to rotate while said mount is affixed to a stationary structure.

6. The holder of claim 2 further including an elongated tray adapted to be mounted to a flat surface, and a mount attached to a side of said base opposite said cable, said mount adapted to be supported by said elongated tray and to move in said tray in the direction of elongation of said tray.

7. The holder of claim 6 wherein said mount is adapted to allow said base to rotate while said mount is affixed to a stationary structure.

8. The holder of claim 2 further including a mount adjustably attached to a side of said base opposite said cable, said mount adapted to move along said base such that said mount can be centered over the computer unit supported by said cable.

9. The holder of claim 2 further including at least one cable guide, said cable guide including a channel for threading said cable therethrough, said cable guide having a first and second surfaces, said first and second surfaces being oriented perpendicular to each other and adapted to contact a side and bottom of a computer unit, respectively.

10. The holder of claim 2 further including:
    a first side panel mounted to said base and oriented generally perpendicularly to said base;
    a second side panel adjustably mounted to said base and oriented generally perpendicularly to said base and parallel to said first side panel, said second side panel adapted to be moved toward and away from said first panel along said base.

11. The holder of claim 10 wherein said cable is mounted to one or both of said first and second side panels and extends between said first and second side panels at least twice.

12. The holder of claim 10 further including at least four cable guides, said cable guides including a channel for threading said cable therethrough, said cable guides each having a first and second surface, said first and second surfaces being oriented perpendicular to each other and adapted to contact a side and bottom of the computer unit, respectively.

* * * * *